(12) United States Patent
Jones et al.

(10) Patent No.: US 7,788,155 B2
(45) Date of Patent: Aug. 31, 2010

(54) FINANCIAL ADVISORY SYSTEM

(75) Inventors: Christopher L. Jones, Foster City, CA (US); William F. Sharpe, Los Altos, CA (US); Jason S. Scott, Menlo Park, CA (US); John G. Watson, Menlo Park, CA (US); Jeff N. Maggioncalda, Menlo Park, CA (US); Geert Bekaert, Menlo Park, CA (US); Steven R. Grenadier, Los Altos, CA (US); Ronald T. Park, Menlo Park, CA (US)

(73) Assignee: Financial Engines, Inc., Palo Alto, CA (US)

( * ) Notice: Subject to any disclaimer, the term of this patent is extended or adjusted under 35 U.S.C. 154(b) by 679 days.

(21) Appl. No.: 11/219,513

(22) Filed: Sep. 2, 2005

(65) Prior Publication Data
US 2006/0010060 A1 Jan. 12, 2006

Related U.S. Application Data

(60) Division of application No. 09/495,982, filed on Feb. 1, 2000, now Pat. No. 7,016,870, which is a continuation-in-part of application No. 08/982,942, filed on Dec. 2, 1997, now Pat. No. 6,021,397.

(51) Int. Cl.
*G06Q 40/00* (2006.01)
(52) U.S. Cl. ...................... 705/36 R; 705/35
(58) Field of Classification Search ............. 705/36 R
See application file for complete search history.

(56) References Cited
U.S. PATENT DOCUMENTS
3,634,669 A 1/1972 Soumas et al.
(Continued)

FOREIGN PATENT DOCUMENTS
EP 0 572 281 A1 12/1993
(Continued)

OTHER PUBLICATIONS
Merton "A Functional Perspective of Financial Intermediation." Financial Management v24n2, pp. 23-41, Summer 1995, ISSN: 0046-3892.
(Continued)

*Primary Examiner*—James A Kramer
*Assistant Examiner*—James A Vezeris
(74) *Attorney, Agent, or Firm*—Hamilton, DeSanctis & Cha, LLP

(57) ABSTRACT

A financial advisory system is provided. According to one aspect of the present invention, return scenarios for optimized portfolio allocations are simulated interactively to facilitate financial product selection. Return scenarios for each asset class of a plurality of asset classes are generated based upon estimated future scenarios of one or more economic factors. A mapping from each financial product of an available set of financial products onto one or more asset classes of the plurality of asset classes is created by determining exposures of the available set of financial products to each asset class of the plurality of asset classes. In this way, the expected returns and correlations of a plurality of financial products are generated and used to produce optimized portfolios of financial products. Return scenarios are simulated for one or more portfolios including combinations of financial products from the available set of financial products based upon the mapping.

32 Claims, 8 Drawing Sheets

U.S. PATENT DOCUMENTS

| | | |
|---|---|---|
| 3,697,693 A | 10/1972 | Deschenes et al. |
| 4,007,355 A | 2/1977 | Moreno |
| 4,334,270 A | 6/1982 | Towers |
| 4,346,442 A | 8/1982 | Musmanno |
| 4,376,978 A | 3/1983 | Musmanno |
| 4,597,046 A | 6/1986 | Musmanno et al. |
| 4,642,767 A | 2/1987 | Lerner |
| 4,648,037 A | 3/1987 | Valentino |
| 4,722,055 A | 1/1988 | Roberts |
| 4,742,457 A | 5/1988 | Leon et al. |
| 4,752,877 A | 6/1988 | Roberts et al. |
| 4,774,663 A | 9/1988 | Musmanno et al. |
| 4,868,376 A | 9/1989 | Lessin et al. |
| 4,876,648 A | 10/1989 | Lloyd |
| 4,885,685 A | 12/1989 | Wolfberg et al. |
| 4,910,676 A | 3/1990 | Alldredge |
| 4,933,842 A | 6/1990 | Durbin et al. |
| 4,953,085 A | 8/1990 | Atkins |
| 4,989,141 A | 1/1991 | Lyons et al. |
| 5,025,138 A | 6/1991 | Cuervo |
| 5,101,353 A | 3/1992 | Lupien et al. |
| 5,126,936 A | 6/1992 | Champion et al. |
| 5,132,899 A | 7/1992 | Fox |
| 5,148,365 A | 9/1992 | Dembo |
| 5,220,500 A | 6/1993 | Baird |
| 5,222,019 A | 6/1993 | Yoshino et al. |
| 5,227,967 A | 7/1993 | Bailey |
| 5,237,500 A | 8/1993 | Perg et al. |
| 5,454,104 A | 9/1995 | Steidlmayer et al. |
| 5,471,575 A | 11/1995 | Giansante |
| 5,523,942 A | 6/1996 | Tyler et al. |
| 5,553,212 A | 9/1996 | Etoh |
| 5,563,783 A | 10/1996 | Stolfo et al. |
| 5,590,037 A | 12/1996 | Ryan |
| 5,592,379 A | 1/1997 | Finfrock et al. |
| 5,644,727 A | 7/1997 | Atkins |
| 5,692,233 A | 11/1997 | Garman |
| 5,784,696 A | 7/1998 | Melnikoff |
| 5,799,287 A | 8/1998 | Dembo |
| 5,806,049 A | 9/1998 | Petruzzi |
| 5,812,987 A * | 9/1998 | Luskin et al. ............. 705/36 R |
| 5,819,238 A | 10/1998 | Fernholz |
| 5,839,804 A | 11/1998 | Ho |
| 5,864,827 A | 1/1999 | Wilson |
| 5,864,828 A | 1/1999 | Atkins |
| 5,875,437 A | 2/1999 | Atkins |
| 5,884,283 A | 3/1999 | Manos |
| 5,884,285 A | 3/1999 | Atkins |
| 5,884,287 A * | 3/1999 | Edesess ................... 705/36 R |
| 5,907,801 A | 5/1999 | Albert |
| 5,911,135 A | 6/1999 | Atkins |
| 5,911,136 A | 6/1999 | Atkins |
| 5,913,202 A | 6/1999 | Motoyama |
| 5,918,217 A | 6/1999 | Maggioncalda et al. |
| 5,918,218 A | 6/1999 | Harris |
| 5,930,762 A | 7/1999 | Masch |
| 5,930,774 A | 7/1999 | Chennault |
| 5,930,775 A | 7/1999 | McCauley et al. |
| 5,933,815 A | 8/1999 | Golden |
| 5,978,778 A | 11/1999 | O'Shaughnessy |
| 5,987,433 A | 11/1999 | Crapo |
| 5,987,434 A | 11/1999 | Libman |
| 5,991,744 A | 11/1999 | DiCresce |
| 5,999,918 A | 12/1999 | Williams et al. |
| 6,003,018 A | 12/1999 | Michaud et al. |
| 6,012,042 A | 1/2000 | Black et al. |
| 6,012,043 A | 1/2000 | Albright et al. |
| 6,012,044 A | 1/2000 | Maggioncalda |
| 6,018,722 A | 1/2000 | Ray et al. |
| 6,021,397 A | 2/2000 | Jones et al. |
| 6,078,904 A | 6/2000 | Rebane |
| 6,125,355 A | 9/2000 | Bekaert |
| 6,154,732 A | 11/2000 | Tarbox |
| 6,275,814 B1 | 8/2001 | Giansante |
| 6,282,520 B1 | 8/2001 | Schirripa |
| 6,292,787 B1 | 9/2001 | Scott |
| 6,496,741 B1 | 12/2002 | Whiffen |
| 6,601,044 B1 | 7/2003 | Wallman |

FOREIGN PATENT DOCUMENTS

| | | |
|---|---|---|
| GB | 2306713 | 7/1997 |
| JP | 04-193658 | 7/1992 |
| JP | 05-177511 | 6/1993 |
| JP | 05-081202 | 8/1993 |
| WO | WO 91/02326 | 2/1991 |
| WO | WO 96/06402 | 2/1996 |
| WO | WO 98/193776 | 4/1998 |
| WO | WO 98/44444 | 10/1998 |
| WO | WO 98/54666 | 12/1998 |
| WO | WO 99/05625 | 2/1999 |
| WO | WO 99/15985 | 4/1999 |
| WO | WO 99/22323 | 5/1999 |
| WO | WO 01/05793 | 1/2001 |

OTHER PUBLICATIONS

Nikolopoulos and Fellrath, "A Hybrid Expert System for Investment Advising", IEEE, 1994, pp. 1818-1820.

Eggenschwiler and Gamma, "ET++SwapsManager: Using Object Technology in the financial Engineering Domain", OOPSLA, 1992, pp. 166-177.

Jensen and King, "Frontier: A graphical interface for portfolio optimization in a piecewise linear-quadratic risk framework", IBM Systems Journal, vol. 31, No. 1, 1992, pp. 62-70.

Schmerken, "Making Risk Analysis Easy As Alpha, Beta", Wall Street Computer Review, 1988, vol. 5 #4, pp. 8, 10, 12.

Malliaris and Salchenberger, "Beating the Best: A Neural Network Challenges the Black-Scholes Formula", IEEE, 1993, pp. 445-449.

1990 Buyer's Guide, Wall Street Computer Review, 1990, 23 pages.

Pantazopoulos et al., "A knowledge Based System for Evaluation of Option Pricing Algorithms", Computer Science Dept., Purdue University, 1998, pp. 123-140.

Tanaka et al., "Possibility Portfolio Selection", IEEE, 1995, pp. 813-818.

Bellity, "Optimisation Floue Appliquee Au Choix De Portfeuilles", CCF Recherche & Innovation, 1994, 8 pages.

King, "Asymmetric risk measures and tracking models for portfolio optimization under uncertainty", J.C. Baltzer AG, 1993, pp. 165-177.

"InterFace Institutional Software + Data", Ibbotson Associates, Wall Street Computer Review, 1998, 4 pages.

Edessess, Michael et al. "Scenario forecasting: Necessity, not choice." Journal of Portfolio Management, vol. 6, No. 3, pp. 10-15, Sprg 1980.

"Keeping up with Technology: the 1991 software update" Trusts & Estates, pp. 34-67, Jun. 1991.

Keyes, Jessica. "Expert Allocator: Tools for portfolio optimization." Pension Management, pp. 44-46, May 1996.

Paroush, Jacob. "Risk and walth effects on efficient portfolio." Metroeconomics, vol. 26, No. 1-3, pp. 86-96, 1974.

Society of Actuaries., "1994 Group Annuity Mortality Table and 1994 Group Annuity Reserving Table."" vol. 47. 1994; pp. 865-913.

"Learning about Artificial Intelligence", Institutional Investor, 4 pages, Jul. 1986.

"Software Packages for Investors", Fortune Investors Guide, 6 pages, 1987.

Voros, J. "Portfolio Analysis—An Analytic Derivation of the Efficient Portfolio Frontier." European Journal of Operations Research, vol. 23, No. 3, pp. 294-300, Mar. 1986.

Science & Technology "A Financial Planner with Nerves of Silicon", Business Week, Oct. 7, 198, 3 pages.

W.F. Sharpe, "Asset Allocation: Management style and performance measurement", The Journal of Portfolio Management, Winter 1992, 14 pages.

Donald R. Woodwell, "Automating Your Financial Portfolio", Second Edition, Dow Jones Irwin, 1983 and 1986.

Barra, Inc. "BARRA Provides Combined Style Analysis and Asset Allocation Capabilities", BARRA Portfolio, 1996, 9 pages.

Henry Fersko-Weiss, "Dialing For Profits", Personal Computing, May 1986, 3 pages.

"EnCorr", Ibbotson Associates, 1998, 48 pages.

Software Update, "Funds Allocation System", IBM Corporation, 9 pages.

W.F.Sharpe, G.J. Alexander & J.V. Bailey, "Investments", Fifth Edition, Prentice Hall, 1995, 107 pages.

"Net Results", Investment Strategies Network, Inc., 1995, 1996, 1997, 97 pages.

Lichtman, "Software: The Professional Plan", Lotus, Nov. 1986, 4 pages.

IFPS/Optimum, "The Extended Analysis Language for All Users", Execucom Systems Corporation, 1986, 4 pages.

"Asset Allocation—One Step At a Time", Global Investor, Mar. 1997, 8 pages.

Murray, G.W. et al. "Practical Optimization." Academic Press. Chapter 5. 1981.

Anonymous., "Interactive Software Eases 401(k) Planning." Bank Marketing. V26. No. 10. 1994; p. 56.

Author Unknown., "Interactive Variable Control During Visualization of Mathematical Functions." IBM Technical Disclosure Bulletin. vol. 34. No. 9. 1992; pp. 288-289.

Author Unknown., "Microsoft Excel 97 Intermediate." © Cheltenham Computer Training 1995-2001. www.cctglobal.com. pp. 26-30.

Bowers, N.L., "Acturial Mathematics." The Society of Actuaries. 1986; pp. 52-59.

Carhart, M., "On Persistence in Mutual Fund Performance." The Journal of Finance. vol. 52. No. 1. 1997; pp. 57-82.

Kariya, T., "Elements of Financial Science." Toyo Keizai Shimpo, K.K., Sep. 25, 1997, pp. 71-101 (Capter 5) and pp. 117-133 (Chapter 7).

Sharpe, W., "Asset Allocation Tools." The Scientific Press. 1985.

"Financial Analysis." Chapter 23. pp. 827-863.

"Portfolio Analysis." Chapter 8. pp. 206-231.

* cited by examiner

FINANCIAL ADVISORY SYSTEM

This is a Divisional of U.S. patent application Ser. No. 09/495,982, filed on Feb. 1, 2000, currently pending, which is a Continuation-In-Part of application Ser. No. 08/982,942, filed on Dec. 2, 1997, now issued as U.S. Pat. No. 6,021,397.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of financial advisory services. More particularly, the invention relates to a system for advising a user regarding feasible and optimal portfolio allocations among a set of available financial products.

2. Description of the Related Art

During the 1980's, a significant trend emerged in retirement savings. Traditional defined benefit plan assets began shifting towards employee-directed defined contribution plans like 401(k). As this trend continues, many individual investors will ultimately become responsible for managing their own retirement investments. However, many people are not well-equipped to make informed investment decisions. Further, the number and diversity of investment options available to individuals is rapidly increasing, thereby making investment decisions more complex by the day.

Many investment software packages claim to help individuals plan for a secure retirement, or some other intermediate goal. However, typical prior art investment software packages are limited in several ways. For example, some packages provide generic asset-allocation suggestions (typically in the form of a pie-chart) and leave the investor to find the actual combination of financial products that meets the suggested asset allocation. However, many investments available to individual investors, such as mutual funds, cannot easily be categorized into any one generic asset class category. Rather, mutual funds are typically a mix of many different asset classes. This property of mutual funds complicates the selection of appropriate instruments to realize a desired asset allocation.

Further, some prior art programs, typically referred to as "retirement calculators," require the user to provide estimates of future inflation, interest rates and the expected return on their investments. In this type of prior art system, the user is likely, and is in fact encouraged, to simply increase the expected investment returns until their desired portfolio value is achieved. As should be appreciated, one of the problems with this type of program is that the user is likely to create an unattainable portfolio based on an unrealistic set of future economic scenarios. That is, the portfolio of financial products required to achieve the X% growth per year in order to meet the user's retirement goal may not be available to the user. Further, the idealistic future economic conditions assumed by the user, for example, 0% inflation and 20% interest rates, may not be macroeconomically consistent. Typical prior art investment packages simply allow the user to manipulate economic conditions until a desired result is achieved rather than encouraging the user to focus on his/her own decisions regarding investment risk, savings rate, and retirement age within the context of realistic economic assumptions.

Consequently, the so called "advice" rendered by many of the prior art investment software packages can be misleading and impossible to implement in practice.

In addition, investment advice software in the prior art have various other disadvantages which are overcome by the present invention. Notably, prior art systems typically do not provide realistic estimates of the investment or retirement horizon risk-return tradeoff given a user's specific investments and financial circumstances. This makes informed judgments about the appropriate level of investment risk very difficult. Obtaining the appropriate level of investment risk (and return) is critical to the success of a long-term investment plan.

In view of the foregoing, what is needed is a financial advisory system that employs advanced financial techniques to provide financial advice to individuals on how to reach specific financial goals. More specifically, it is desirable to provide a system that automatically generates future-looking realistic economic and investment return scenarios and allows a user to arrive at a feasible portfolio that meets both intermediate and long-term financial goals by a process of outcome-based risk profiling. In this manner, the user can focus on his/her own decisions regarding investment risk, savings, and retirement age while interactively observing the impact of those decisions on the range of possible investment outcomes. Further, it is desirable that the financial advisory system create a feasible optimal portfolio that maximizes the utility function of the user by selecting financial products that are available to the user and that provides the highest possible utility given the user's risk tolerance, investment horizon and savings level. By utility what is meant is a function that determines the relative preferences of an individual for different combinations of financial products based on one or more characteristics of the products (e.g., expected return, variance, etc.), and optionally one or more parameters specific to the individual. Moreover, it is advantageous to perform plan monitoring on an ongoing basis to alert the user if the likelihood of meeting their financial goals falls below a threshold value or if their portfolio risk level becomes inconsistent with their risk preferences. Finally, it is desirable to provide specific advice to the user regarding steps they can take to improve their chances of meeting their financial goals while taking into consideration the user's personal tradeoffs among risk, savings, and retirement age.

BRIEF SUMMARY OF THE INVENTION

A financial advisory system is described. According to one aspect of the present invention, return scenarios for optimized portfolio allocations are simulated interactively to facilitate financial product selection. Return scenarios for each asset class of a plurality of asset classes are generated based upon estimated future scenarios of one or more economic factors. A mapping from each financial product of an available set of financial products onto one or more asset classes of the plurality of asset classes is created by determining exposures of the available set of financial products to each asset class of the plurality of asset classes. In this way, the expected returns and correlations of a plurality of financial products are generated and used to produce optimized portfolios of financial products. Return scenarios are simulated for one or more portfolios including combinations of financial products from the available set of financial products based upon the mapping.

Other features of the present invention will be apparent from the accompanying drawings and from the detailed description which follows.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
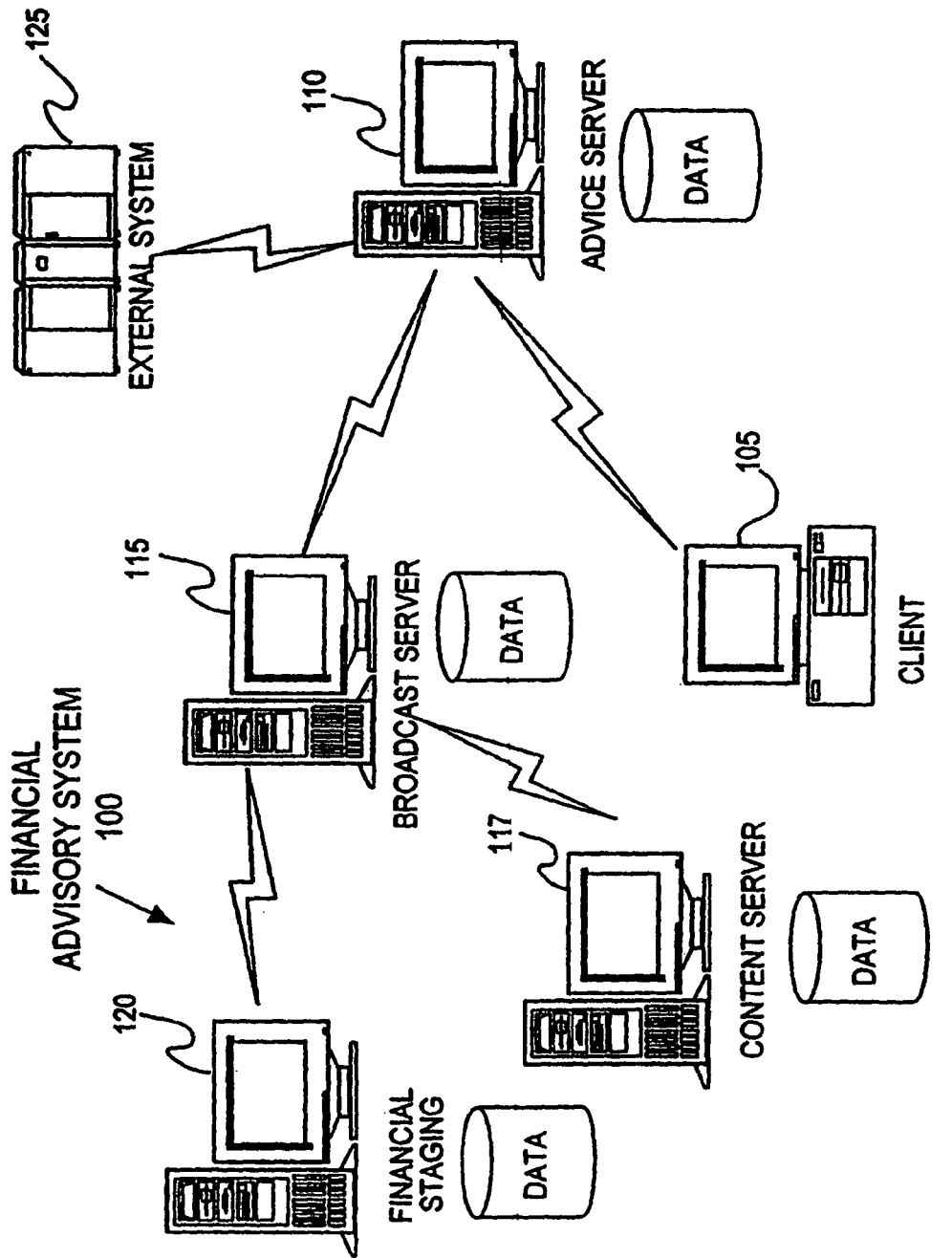
FIG. 1 illustrates a financial advisory system according to one embodiment of the present invention.

A financial advisory system is described. In embodiments of the present invention, a factor model approach is laid on top of a pricing kernel model to simulate returns of a plurality of asset classes, and ultimately financial products, such as securities or portfolios of securities. The term "financial products" as used herein refers to a legal representation of the right (often denoted as a claim or security) to provide or receive prospective future benefits under certain stated conditions. In any event, the forecasts may then be used for purposes of providing financial advisory services to a user. For example, such forecasts are useful for selecting the composition of an optimized portfolio (based on a utility function) from a set of available financial products conditional on decisions and constraints provided by the user.

Briefly, fundamental economic and financial forces are modeled using a pricing kernel model that provides projected returns on a plurality of asset classes (core asset classes) conditional on a set of state variables that capture economic conditions. The core asset classes in combination with additional asset class estimates that are conditioned on the core asset classes comprise a model (hereinafter "the factor model") of a comprehensive set of asset classes that span the universe of typical investment products. A factor model is a return-generating function that attributes the return on a financial product, such as a security, to the financial product's sensitivity to the movements of various common economic factors. The factor model enables the system to assess how financial products and portfolios will respond to changes in factors or indices to which financial products are exposed. The selection of asset classes may be tailored to address a narrow or broad range of investors. For example, asset classes may be chosen that are relevant only to a particular industry or asset classes may be chosen to span the market range of a broad set of possible investments (e.g. all available mutual funds or individual equities). According to embodiments of the present invention discussed herein, to reach the broadest segment of individual investors, the asset classes selected as factors for the factor model have been chosen to span the range of investments typically available to individual investors in mainstream mutual funds and defined contribution plans.

After generating future scenarios for the factor model, financial products available to an investor may be mapped onto the factor model. To assure that a portfolio recommended by the system is attainable, it is preferable to generate investment scenarios that include only those financial products that are available to the investor. The available financial products may include, for example, a specific set of mutual funds offered by an employer sponsored 401(k) program. In any event, this mapping of financial products onto the factor model is accomplished by decomposing the returns of individual financial products into exposures to the asset classes employed by the factor model. In this manner, the system learns how each of the financial products available to the user behave relative to the asset classes employed by the factor model. In so doing, the system implicitly determines the constraints on feasible exposures to different asset classes faced by an investor given a selected subset of financial products. Given this relationship between the user's available financial products and the factor model, the system may generate feasible forward-looking investment scenarios. The system may further advise the user regarding actions that may be taken (e.g., save more money, retire later, take on additional investment risk, seek opportunities to expand the investment set) to achieve certain financial goals, such as particular retirement standard of living, accumulating a down payment for the purchase of a house, or saving enough money to send a child to college.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be embodied in machine-executable instructions. The instructions can be used to cause a general-purpose or special-purpose processor that is programmed with the instructions to perform the steps of the present invention. Alternatively, the steps of the present invention may be performed by specific hardware components that contain hardwired logic for performing the steps, or by any combination of programmed computer components and custom hardware components.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

While, embodiments of the present invention will be described with reference to an financial advisory system, the method and apparatus described herein are equally applicable to other types of asset allocation applications, financial planning applications, investment advisory services, financial product selection services, automated financial product screening tools, such as electronic personal shopping agents and the like.

System Overview

The present invention may be included within a client-server transaction based financial advisory system 100 such as that illustrated in FIG. 1. According to the embodiment depicted in FIG. 1, the financial advisory system 100 includes a financial staging server 120, a broadcast server 115, a content server 117, an AdviceServer™ 110 (AdviceServer™ is a trademark of Financial Engines, Inc., the assignee of the present invention), and a client 105.

The financial staging server 120 may serve as a primary staging and validation area for the publication of financial content. In this manner, the financial staging server 120 acts as a data warehouse. Raw source data, typically time series data, may be refined and processed into analytically useful data on the financial staging server 120. On a monthly basis, or whatever the batch processing interval may be, the financial staging server 120 converts raw time series data obtained from data vendors from the specific vendor's format into a standard format that can be used throughout the financial advisory system 100. Various financial engines may be run to generate data for validation and quality assurance of the data received from the vendors. Additional engines may be run to generate module inputs, model parameters, and intermediate calculations needed by the system based on raw data received by the vendors. Any calibrations of the analytic data needed by the financial engines may be performed prior to publishing the final analytic data to the broadcast server 115.

The broadcast server 115 is a database server. As such, it runs an instance of a Relational Database Management System (RDBMS), such as Microsoft SQL-Server™, Oracle™ or the like. The broadcast server 115 provides a single point of access to all fund information and analytic data. When advice servers such as AdviceServer 110 need data, they may query information from the broadcast server database. The broadcast server 115 may also populate content servers, such as content server 117, so remote implementations of the AdviceServer 110 need not communicate directly with the broadcast server 115.

The AdviceServer 110 is the primary provider of services for the client 105. The AdviceServer 110 also acts as a proxy between external systems, such as external system 125, and the broadcast server 115 or the content server 117. The AdviceServer 110 is the central database repository for holding user profile and portfolio data. In this manner, ongoing portfolio analysis may be performed and alerts may be triggered, as described further below.

According to the embodiment depicted, the user may interact with and receive feedback from the financial advisory system 100 using client software which may be running within a browser application or as a standalone desktop application on the user's personal computer 105. The client software communicates with the AdviceServer 110 which acts as a HTTP server.

Overview of Exemplary User Interaction with the System

During an initial session with the financial advisory system 100, according to one embodiment of the present invention, the user may provide information regarding risk preferences, savings preferences, current age, gender, income, expected income growth, current account balances, current financial product holdings, current savings rate, retirement age goal, retirement income goals, available financial products, intermediate and long-term goals, constraints on fund holdings, liabilities, expected contributions, state and federal tax bracket (marginal and average). The user may provide information for themselves and each profiled person in their household. This information may be saved in one or more files in the financial advisory system 100, preferably on one of the servers to allow ongoing plan monitoring to be performed. In other embodiments of the present invention additional information may be provided by the user, for example, estimates of future social security benefits or anticipated inheritances.

Based on the user's current holdings the system may forecast a retirement income and graphically depict the current portfolio's projected growth and range of possible values over time.

The system may also provide the user with statistics regarding the likelihood that they will be able to retire when they would like, given the projected returns on the user's current portfolio based upon the data input by the user, including the user's current savings rate, retirement age goal, and investment holdings.

Based on models and calculations that will be discussed in more detail below, the financial advisory system 100 may provide an initial diagnosis based upon the user's risk preference, savings rate, and desired risk-return tradeoffs. This diagnosis can result in a series of suggested actions including: (1) rebalance the portfolio, (2) increase savings, (3) retire later, or (4) adjust investment risk. An iterative process may then begin in which the user may adjust his/her investment risk, savings rate, and/or retirement age and have the financial advisory system 100 evaluate the projected performance of an optimized portfolio given the financial products available to the user based on the currently selected risk tolerance, investment horizon and savings rate decisions. This process of the financial advisory system 100 providing advice and/or feedback and the user adjusting risk, savings, and retirement age parameters may continue until the user has achieved a desired portfolio forecast and performance distribution. At this time, the user may chose to implement the optimal portfolio. The parameters and portfolio allocation may then be saved by the financial advisory system 100 for future user sessions.

As described further below, on an ongoing basis the financial advisory system 100 may evaluate the user's portfolio against one or more financial goals and may notify the user if progress towards any of the goals has changed in a material way.

In subsequent user sessions with the financial advisory system 100, the user's data (e.g., the user's profile information, account holdings, plan parameters, and tax information) may be retrieved from memory on the AdviceServer 110, for example, and the current forecast for the one or more goals may be presented to the user. Additionally, if the ongoing plan monitoring has generated any alerts, they may be presented to the user at this time. Alternatively, alerts may be generated proactively by the system and transmitted to the user via a telephone, email, fax, or standard mail messaging system. Based upon the alerts generated by the ongoing plan monitoring, the user may again begin the iterative process of adjusting the decision variables described above (e.g., risk level, savings rate, and retirement age) until the user is satisfied with the likelihood of meeting his/her goal(s). To assure accurate portfolio tracking, if the personal data changes, the user may simply modify the data upon which the financial advisory system's assumptions are based. For example, if the user's salary increases, this information should be updated in the user's profile. Additionally, if the user's employer adds a new mutual fund to the company's 401(k) program, then the user should update the list of available financial products in the user profile information. This is important because the optimal allocation among the user's available financial products may be impacted by the addition of a new mutual fund, for example. In one embodiment of the present invention, the financial advisory system 100 may be connected to external record-keeping systems at the user's employer that can provide automatic updates to selected user information.

Advantageously, the user is never asked to predict the future with regard to interest rates, inflation, expected portfolio returns, or other difficult to estimate economic variables and parameters. Additionally, the optimal portfolio generated by the financial advisory system 100 is guaranteed to be attainable. That is, the optimal portfolio has been determined based upon the specific financial products that are available to the user.

An Exemplary Computer System

Figure 2:
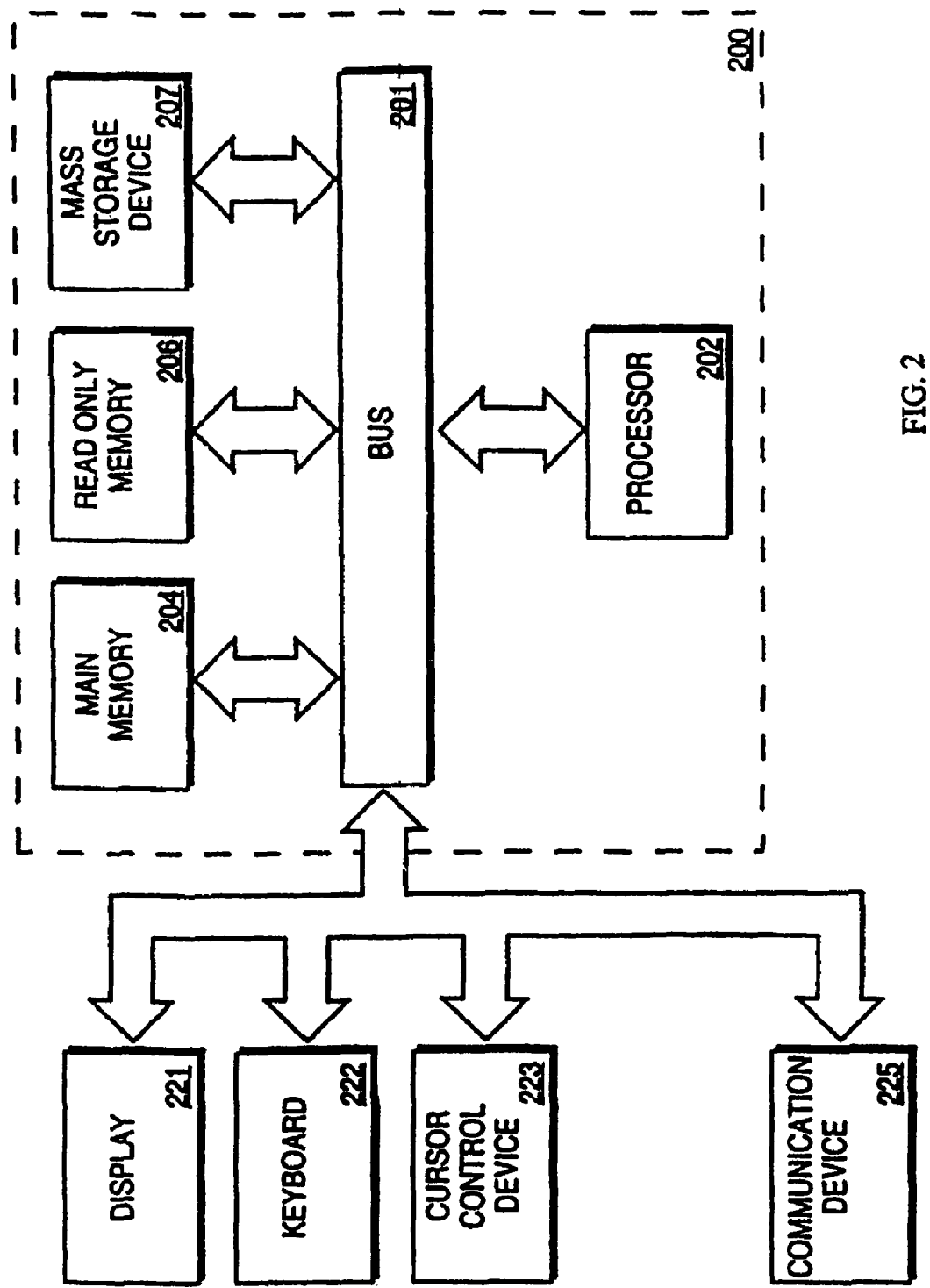
FIG. 2 is an example of a typical computer system upon which one embodiment of the present invention can be implemented.

Having briefly described one embodiment of the financial advisory system 100 and exemplary user interactions, a computer system 200 representing an exemplary client 105 or server in which features of the present invention may be implemented will now be described with reference to FIG. 2. Computer system 200 comprises a bus or other communication means 201 for communicating information, and a processing means such as processor 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202.

A data storage device 207 such as a magnetic disk or optical disc and its corresponding drive may also be coupled to computer system 200 for storing information and instructions. Computer system 200 can also be coupled via bus 201 to a display device 221, such as a cathode ray tube (CRT) or Liquid Crystal Display (LCD), for displaying information to a computer user. For example, graphical depictions of expected portfolio performance, asset allocation for an optimal portfolio, charts indicating retirement age probabilities, and other data types may be presented to the user on the display device 221. Typically, an alphanumeric input device 222, including alphanumeric and other keys, may coupled to bus 201 for communicating information and/or command selections to processor 202. Another type of user input device is cursor control 223, such as a mouse, a trackball, or cursor direction keys for communicating direction information and command selections to processor 202 and for controlling cursor movement on display 221.

A communication device 225 is also coupled to bus 201 for accessing remote servers, such as the AdviceServer 110, or other servers via the Internet, for example. The communication device 225 may include a modem, a network interface card, or other well known interface devices, such as those used for coupling to an Ethernet, token ring, or other types of networks. In any event, in this manner, the computer system 200 may be coupled to a number of clients and/or servers via a conventional network infrastructure, such as a company's Intranet and/or the Internet, for example.

Exemplary Analytic Modules

Figure 3:
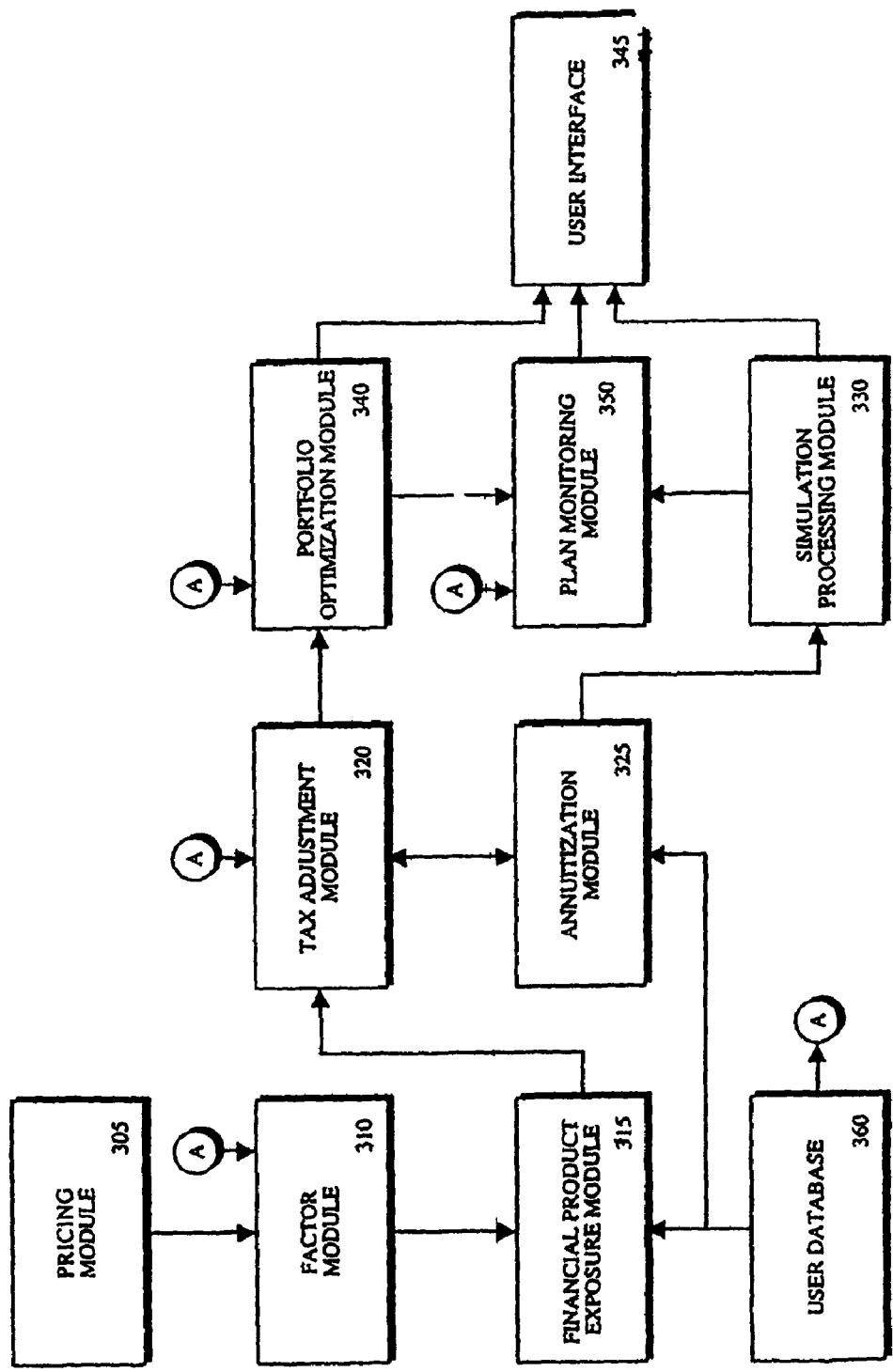
FIG. 3 is a block diagram illustrating various analytic modules according to one embodiment of the present invention.

FIG. 3 is a simplified block diagram illustrating exemplary analytic modules of the financial advisory system 100 according to one embodiment of the present invention. According to the embodiment depicted, the following modules are provided: a pricing module 305, a factor module 310, a financial product mapping module 315', a tax adjustment module 320, an annuitization module 325, a simulation processing module 330, a portfolio optimization module 340, a user interface (UI) module 345, and a plan monitoring module 350. It should be appreciated that the functionality described herein may be implemented in more or less modules than discussed below. Additionally, the modules and functionality may be distributed in various configurations among a client system, such as client 105 and one or more server systems, such as the financial staging server 120, the broadcast server 115, or the AdviceServer 110. The functionality of each of the exemplary modules will now be briefly described.

An "econometric model" is a statistical model that provides a means of forecasting the levels of certain variables referred to as "endogenous variables," conditional on the levels of certain other variables, known as "exogenous variables," and in some cases previously determined values of the endogenous variables (sometimes referred to as lagged dependent variables). The pricing module 305 is an equilibrium econometric model for forecasting prices and returns (also referred to herein as "core asset scenarios") for a set of core asset classes. The pricing module provides estimates of current levels and forecasts of economic factors (also known as state variables), upon which the estimates of core asset class returns are based. According to one embodiment of the present invention, the economic factors may be represented with three exogenous state variables, price inflation, a real short-term interest rate, and dividend growth. The three exogenous state variables may be fitted with autoregressive time series models to match historical moments of the corresponding observed economic variables, as described further below.

In any event, the resulting core asset classes are the foundation for portfolio simulation and are designed to provide a coherent and internally consistent (e.g., no arbitrage) set of returns. By arbitrage what is meant is an opportunity to create a profitable trading opportunity that involves no net investment and positive values in all states of the world.

According to one embodiment, the core asset classes include short-term US government bonds, long-term US government bonds, and US equities. To expand the core asset classes to cover the full range of possible investments that people generally have access to, additional asset classes may be incorporated into the pricing module 305 or the additional asset classes may be included in the factor model 310 and be conditioned on the core asset classes, as discussed further below.

Based upon the core asset scenarios generated by the pricing module 305, the factor module 310 produces return scenarios (also referred to herein as "factor model asset scenarios") for a set of factor asset classes that are used for both exposure analysis, such as style analysis, and the simulation of portfolio returns. The additional asset classes, referred to as factors, represented in the factor model are conditional upon the core asset class return scenarios generated by the pricing module 305. According to one embodiment, these additional factors may correspond to a set of asset classes or indices that are chosen in a manner to span the range of investments typically available to individual investors in mainstream mutual funds and defined contribution plans. For example, the factors may be divided into the following groups: cash, bonds, equities, and foreign equities. The equities group may further be broken down into two different broad classifications (1) value versus growth and (2) market capitalization. Growth stocks are basically stocks with relatively high prices relative to their underlying book value (e.g., high price-to-book ratio). In contrast, value stocks have relatively low prices relative to their underlying book value. With regard to market capitalization, stocks may be divided into groups of large, medium, and small capitalization. An exemplary set of factors is listed below in Table 1.

Exemplary Set of Factors

TABLE 1

| Group | Factor |
| --- | --- |
| Cash: | Short Term US Bonds (core class) |
| Bonds: | Intermediate-term US Bonds (core class) |
| | Long-term US Bonds (core class) |
| | US Corporate Bonds |
| | US Mortgage Backed Securities |
| | Non-US Government Bonds |
| Equities: | Large Cap Stock -- Value |
| | Large Cap Stock -- Growth |
| | Mid Cap Stock -- Value |
| | Mid Cap Stock -- Growth |
| | Small Cap Stock -- Value |
| | Small Cap Stock -- Growth |
| Foreign: | International Equity -- Europe |
| | International Equity -- Pacific |
| | International Equity -- Emerging Markets |

At this point it is important to point out that more, less, or a completely different set of factors may be employed depending upon the specific implementation. The factors listed in Table 1 are simply presented as an example of a set of factors that achieve the goal of spanning the range of investments typically available to individual investors in mainstream mutual funds and defined contribution plans. It will be apparent to those of ordinary skill in the art that alternative factors may be employed. In particular, it is possible to construct factors that represent functions of the underlying asset classes for pricing of securities that are nonlinearly related to the prices of certain asset classes (e.g., derivative securities). In other embodiments of the present invention, additional factors may be relevant to span a broader range of financial alternatives, such as industry specific equity indices.

On a periodic basis, the financial product mapping module 315 maps financial product returns onto the factor model. In one embodiment, the process of mapping financial product returns onto the factor model comprises decomposing financial product returns into exposures to the factors. The mapping, in effect, indicates how the financial product returns behave relative to the returns of the factors. According to one embodiment, the financial product mapping module 315 is located on one of the servers (e.g., the financial staging server 120, the broadcast server 115, or the AdviceServer 110). In alternative embodiments, the financial product mapping module 315 may be located on the client 105.

In one embodiment of the present invention, an external approach referred to as "returns-based style analysis" is employed to determine a financial product's exposure to the factors. The approach is referred to as external because it does not rely upon information that may be available only from sources internal to the financial product. Rather, in this embodiment, typical exposures of the financial product to the factors may be established based simply upon realized returns of a financial product, as described further below. For more background regarding returns-based style analysis see Sharpe, William F. "Determining a Fund's Effective Asset Mix," Investment Management Review, December 1988, pp. 59-69 and Sharpe, William F. "Asset Allocation: Management Style and Performance Measurement," The Journal of Portfolio Management, 18, no. 2 (Winter 1992), pp. 7-19 ("Sharpe [1992]").

Alternative approaches to determining a financial product's exposure to the factors include surveying the underlying assets held in a financial product (e.g. a mutual fund) via information filed with regulatory bodies, categorizing exposures based on standard industry classification schemes (e.g. SIC codes), identifying the factors exposures based on analysis of the structure of the product (e.g. equity index options, or mortgage backed securities), and obtaining exposure information based on the target benchmark from the asset manager of the financial product. In each method, the primary function of the process is to determine the set of factor exposures that best describes the performance of the financial product.

The tax adjustment module 320 takes into account tax implications of the financial products and financial circumstances of the user. For example, the tax adjustment module 320 may provide methods to adjust taxable income and savings, as well as estimates for future tax liabilities associated with early distributions from pension and defined contribution plans, and deferred taxes from investments in qualified plans. Further, the returns for financial products held in taxable investment vehicles (e.g. a standard brokerage account) may be adjusted to take into account expected tax effects for both accumulations and distributions. For example, the component of returns attributable to dividend income should be taxed at the user's income tax rate and the component of returns attributable to capital gains should be taxed at an appropriate capital gains tax rate depending upon the holding period.

Additionally, the tax module 320 may forecast future components of the financial products total return due to dividend income versus capital gains based upon one or more characteristics of the financial products including, for example, the active or passive nature of the financial product's management, turnover ratio, and category of financial product. This allows precise calculations incorporating the specific tax effects based on the financial product and financial circumstances of the investor. Finally, the tax module 320 facilitates tax efficient investing by determining optimal asset allocation among taxable accounts (e.g., brokerage accounts) and non-taxable accounts (e.g., an Individual Retirement Account (IRA), or employer sponsored 401(k) plan). In this manner the tax module 320 is designed to estimate the tax impact for a particular user with reference to that particular user's income tax rates, capital gains rates, and available financial products. Ultimately, the tax module 320 produces tax-adjusted returns for each available financial product and tax-adjusted distributions for each available financial product.

The portfolio optimization module 340 calculates the utility maximizing set of financial products under a set of constraints defined by the user and the available feasible investment set. In one embodiment, the calculation is based upon a mean-variance optimization of the financial products. The constraints defined by the user may include bounds on asset class and/or specific financial product holdings. In addition, users can specify intermediate goals such as buying a house or putting a child through college, for example, that are incorporated into the optimization. In any event, importantly, the optimization explicitly takes into account the impact of future contributions and expected withdrawals on the optimal asset allocation. Additionally, the covariance matrix used during optimization is calculated based upon the forecasts of expected returns for the factors generated by the factor module 310 over the investment time horizon. As a result, the portfolio optimization module 340 may explicitly take into account the impact of different investment horizons, including the horizon effects impact from intermediate contributions and withdrawals.

The simulation processing module 330 provides additional analytics for the processing of raw simulated return scenarios into statistics that may be displayed to the user via the UI 345. In the one embodiment of the present invention, these analytics generate statistics such as the probability of attaining a certain goal, or the estimated time required to reach a certain level of assets with a certain probability. The simulation processing module 330 also incorporates methods to adjust the simulated scenarios for the effects induced by sampling error in relatively small samples. The simulation processing module 330 provides the user with the ability to interact with the portfolio scenarios generated by the portfolio optimization module 340 in real-time.

The annuitization module 325 provides a meaningful way of representing the user's portfolio value at the end of the term of the investment horizon. Rather than simply indicating to the user the total projected portfolio value, one standard way of conveying the information to the user is converting the projected portfolio value into a retirement income number. The projected portfolio value at retirement may be distributed over the length of retirement by dividing the projected portfolio value by the length of retirement. More sophisticated techniques may involve determining how much the projected portfolio value will grow during retirement and additionally consider the effects of inflation. In either event, however, these approaches erroneously assume the length of the retirement period is known in advance.

It is desirable, therefore, to present the user with a retirement income number that is more representative of an actual standard of living that could be locked in for the duration of the user's retirement. According to one embodiment, this retirement income number represents the inflation adjusted income that would be guaranteed by a real annuity purchased from an insurance company or synthetically created via a trading strategy involving inflation-indexed treasury bond securities. In this manner, the mortality risk is taken out of the picture because regardless of the length of the retirement period, the user would be guaranteed a specific annual real income. To determine the retirement income number, standard methods of annuitization employed by insurance companies may be employed. Additionally, mortality probabilities for an individual of a given age, risk profile, and gender may be based on standard actuarial tables used in the insurance industry. For more information see Bowers, Newton L. Jr., et al, "Actuarial Mathematics," The Society of Actuaries, Itasca, Ill., 1986, pp. 52-59 and Society of Actuaries Group Annuity Valuation Table Task Force, "1994 Group Annuity Mortality Table and 1994 Group Annuity Reserving Table," Transactions of the Society of Actuaries, Volume XLVII, 1994, pp. 865-913. Calculating the value of an inflation-adjusted annuity value may involve estimating the appropriate values of real bonds of various maturities. The pricing module 305 generates the prices of real bonds used to calculate the implied real annuity value of the portfolio at the investment horizon.

Referring now to the plan monitoring module 350, a mechanism is provided for alerting the user of the occurrence of various predetermined conditions involving characteristics of the recommended portfolio. Because the data upon which the portfolio optimization module 340 depends is constantly changing, it is important to reevaluate characteristics of the recommended portfolio on a periodic basis so that the user may be notified in a timely manner when there is a need for him/her to take affirmative action, for example. According to one embodiment, the plan monitoring module 350 is located on the AdviceServer 110. In this manner, the plan monitoring module 350 has constant access to the user profile and portfolio data.

In one embodiment, the occurrence of two basic conditions may cause the plan monitoring module 350 to trigger a notification or alert to the user. The first condition that may trigger an alert to the user is the current probability of achieving a goal falling outside of a predetermined tolerance range of the desired probability of achieving the particular goal. Typically a goal is a financial goal, such as a certain retirement income or the accumulation of a certain amount of money to put a child though college, for example. Additionally, the plan monitoring module 350 may alert the user even if the current probability of achieving the financial goal is within the predetermined tolerance range if a measure of the currently recommended portfolio's utility has fallen below a predetermined tolerance level. Various other conditions are contemplated that may cause alerts to be generated. For example, if the nature of the financial products in the currently recommended portfolio have changed such that the risk of the portfolio is outside the user's risk tolerance range, the user may receive an indication that he/she should rebalance the portfolio. Plan monitoring processing, exemplary real world events that may lead to the above-described alert conditions, and additional alert conditions are described further below.

The UI module 345 provides mechanisms for data input and output to provide the user with a means of interacting with and receiving feedback from the financial advisory system 100, respectively. Further description of a UI that may be employed according to one embodiment of the present invention is disclosed in U.S. Pat. Nos. 5,918,217 and 6,012,044, both entitled "USER INTERFACE FOR FINANCIAL ADVISORY SYSTEM," the contents of which are hereby incorporated by reference.

Other modules may be included in the financial advisory system 100 such as a pension module and a social security module. The pension module may be provided to estimate pension benefits and income. The social security module may provide estimates of the expected social security income that an individual will receive upon retirement. The estimates may be based on calculations used by the Social Security Administration (SSA), and on probability distributions for reductions in the current level of benefits.

Core Asset Scenario Generation

Figure 4:
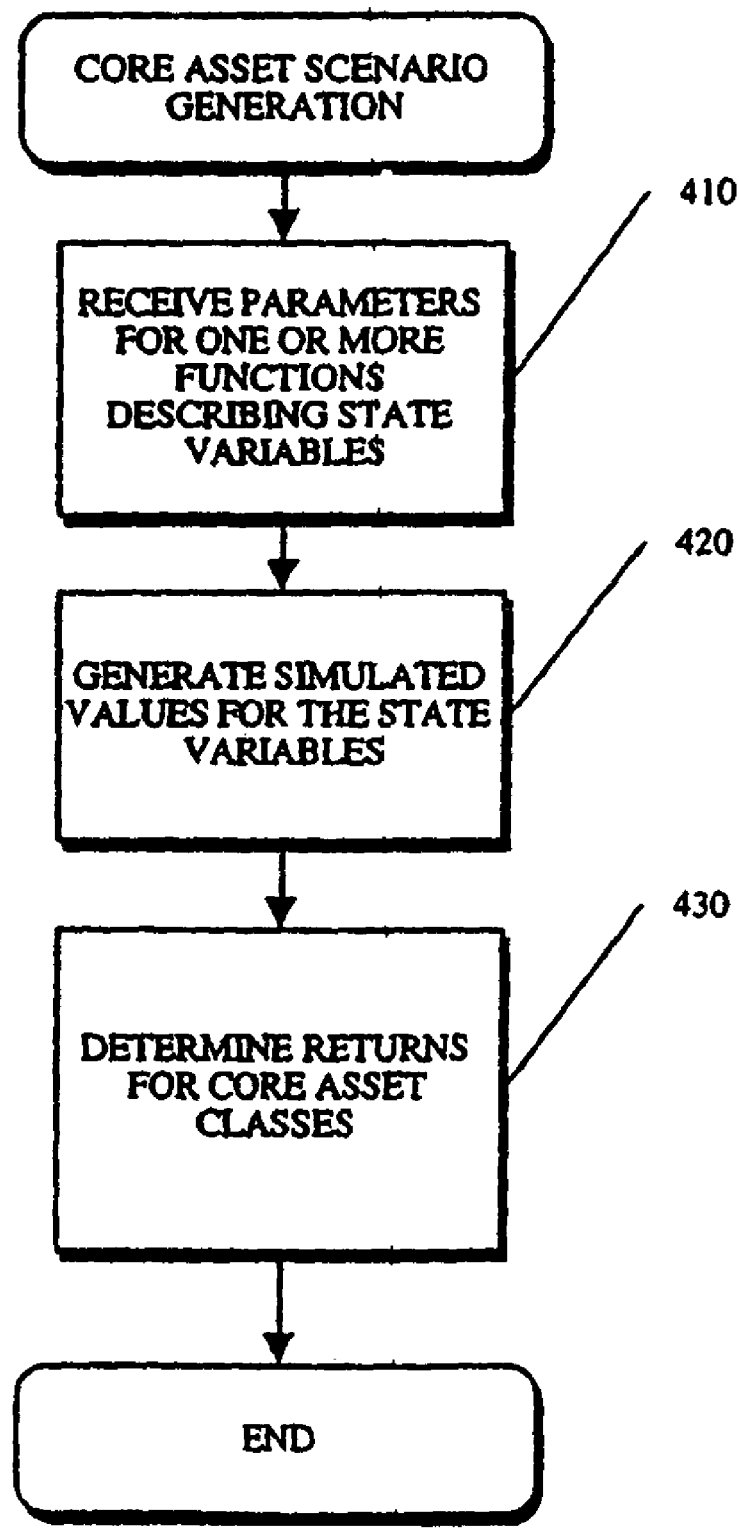
FIG. 4 is a flow diagram illustrating core asset class scenario generation according to one embodiment of the present invention.

FIG. 4 is a flow diagram illustrating core asset class scenario generation according to one embodiment of the present invention. In embodiments of the present invention, core assets include short-term US government bonds, long-term US government bonds, and US equities. At step 410, parameters for one or more functions describing state variables are received. The state variables may include general economic factors, such as inflation, interest rates, dividend growth, and other variables. Typically, state variables are described by econometric models that are estimated based on observed historical data.

At step 420, these parameters are used to generate simulated values for the state variables. The process begins with a set of initial conditions for each of the state variables. Subsequent values are generated by iterating the state variable function to generate new values conditional on previously determined values and a randomly drawn innovation term. In some embodiments, the state variable functions may be deterministic rather than stochastic. In general, the randomly drawn innovation terms for the state variable functions may be correlated with a fixed or conditional covariance matrix.

At step 430, returns for core asset classes are generated conditional on the values of the state variables. Returns of core asset classes may be described by a function of a constant, previously determined core asset class returns, previously determined values of the state variables, and a random innovation term. Subsequent values are generated by iterating a core asset class function to generate new values conditional on previously determined values and a random draws of the innovation term. In some embodiments, the core asset class functions may be deterministic rather than stochastic. In general, the randomly drawn innovation terms for the core asset class functions may be correlated with a fixed or conditional covariance matrix.

In alternative embodiments, steps 410 and 420 may be omitted and the core asset class returns may be generated directly in an unconditional manner. A simple example of such a model would be a function consisting of a constant and a randomly drawn innovation term.

A preferred approach would jointly generate core asset class returns based on a model that incorporates a stochastic process (also referred to as a pricing kernel) that limits the prices on the assets and payoffs in such a way that no arbitrage is possible. By further integrating a dividend process with the other parameters an arbitrage free result can be ensured across both stocks and bonds. Further description of such a pricing kernel is disclosed in a copending U.S. patent application entitled "PRICING KERNEL FOR FINANCIAL ADVISORY SYSTEM," application Ser. No. 08/982,941, filed on Dec. 2, 1997, assigned to the assignee of the present invention, the contents of which are hereby incorporated by reference.

Factor Model Asset Scenario Generation

Figure 5:
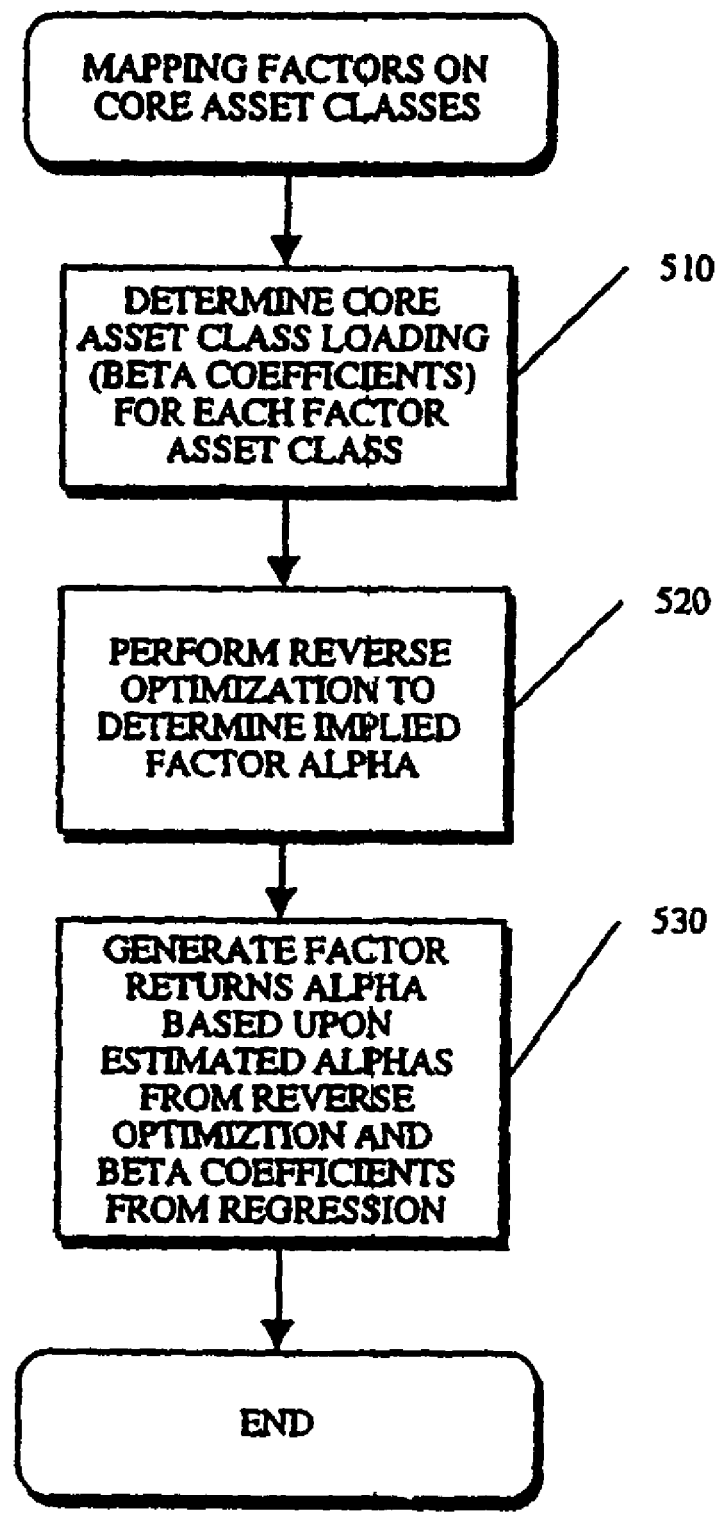
FIG. 5 is a flow diagram illustrating factor asset class scenario generation according to one embodiment of the present invention.

Referring now to FIG. 5, factor model asset scenario generation will now be described. A scenario in this context is a set of projected future values for factors. According to this embodiment, the factors may be mapped onto the core asset factors by the following equation:

$$r_{it} = \alpha_i + \beta_{1i} ST\_Bonds_t + \beta_{2i} LT\_Bonds_t + \beta_{3i} US\_Stocks_t + \epsilon_t \quad \text{(EQ \#1)}$$

where $r_{it}$ represents the return for a factor, i, at time t $\beta_{ji}$ represent slope coefficients or the sensitivity of the factor i to core asset class j $ST\_Bonds_t$ is a core asset class representing the returns estimated by the pricing module 305 for short-term US government bonds at time t $LT\_Bonds_t$ is a core asset class representing the returns estimated by the pricing module 305 for long-term US government bonds at time t.

$US\_Stocks_t$ is a core asset class representing the returns estimated by the pricing module 305 for US stocks at time t.

$\alpha_i$ is a constant representing the average returns of factor asset class i relative to the core asset class exposures ("factor alpha").

$\epsilon_t$ is a residual random variable representing the returns of factor asset class i that are not explained by the core asset class exposures ("residual variance").

At step 510, the beta coefficients (also referred to as the loadings or slope coefficients) for each of the core asset classes are determined. According to one embodiment, a regression is run to estimate the values of the beta coefficients. The regression methodology may or may not include restrictions on the sign or magnitudes of the estimated beta coefficients. In particular, in one embodiment of the present invention, the coefficients may be restricted to sum to one. However, in other embodiments, there may be no restrictions placed on the estimated beta coefficients.

Importantly, the alpha estimated by the regression is not used for generating the factor model asset scenarios. Estimates of alpha based on historical data are extremely noisy because the variance of the expected returns process is quite high relative to the mean. Based on limited sample data, the estimated alphas are poor predictors of future expected returns. At any rate, according to one embodiment, a novel way of estimating the alpha coefficients that reduces the probability of statistical error is used in the calibration of the factor model. This process imposes macroconsistency on the factor model by estimating the alpha coefficients relative to a known efficient portfolio, namely the Market Portfolio. Macroconsistency is the property that expected returns for the factor asset classes are consistent with an observed market equilibrium, that is estimated returns will result in markets clearing under reasonable assumptions. The Market Portfolio is the portfolio defined by the aggregate holdings of all asset classes. It is a portfolio consisting of a value-weighted investment in all factor asset classes. Therefore, in the present example, macroconsistency may be achieved by setting the proportion invested in each factor equal to the percentage of the total market capitalization represented by the particular factor asset class.

At step 520, a reverse optimization may be performed to determine the implied factor alpha for each factor based upon the holdings in the Market Portfolio. This procedure determines a set of factor alphas that guarantee consistency with the observed market equilibrium. In a standard portfolio optimization, Quadratic Programming (QP) is employed to maximize the following utility function:

$$E(r)^T X - \frac{(X^T C(r) X)}{\tau}, u^T X = 1 \quad \text{(EQ \#2)}$$

where,

E(r) represents expected returns for the asset classes,

C(r) represents the covariance matrix for the asset class returns,

τ, Tau, represents a risk tolerance value,

X is a matrix representing the proportionate holdings of each asset class of an optimal portfolio comprising the asset classes, and u is a vector of all ones.

C(r) may be estimated from historical returns data or more advantageously may be estimated from projected returns generated by a pricing kernel model.

Inputs to a standard portfolio optimization problem include E(r), C(r), and Tau and QP is used to determine X. However, in this case, X is given by the Market Portfolio, as described above, and a reverse optimization solves for E(r) by simply backing out the expected returns that yield X equal to the proportions of the Market Portfolio.

Quadratic Programming (QP) is a technique for solving an optimization problem involving a quadratic (squared terms) objective function with linear equality and/or inequality constraints. A number of different QP techniques exist, each with different properties. For example, some are better for suited for small problems, while others are better suited for large problems. Some are better for problems with very few constraints and some are better for problems with a large number of constraints. According to one embodiment of the present invention, when QP is called for, an approach referred to as an "active set" method is employed herein. The active set method is explained in Gill, Murray, and Wright, "Practical Optimization," Academic Press, 1981, Chapter 5.

The first order conditions for the optimization of Equation #2 are:

$$E(r) = 2C(r)\frac{X}{\tau} + Ku \qquad \text{(EQ \#3)}$$

where K is a Lagrange multiplier; hence, knowing the Market Portfolio and any two values of E(r) (for example, the risk free rate and the return on US equities) the full set of expected returns that are consistent with the Market Portfolio can be derived. The two values of E(r) required for the reverse optimization follow from the expected returns of the core assets.

At step 530, factor returns may be generated based upon the estimated alphas from step 520 and the estimated beta coefficients from step 510. As many factor model asset scenarios as are desired may be generated using Equation #1 and random draws for the innovation value $\epsilon_t$. A random value for $\epsilon_t$ is selected for each evaluation of Equation #1. According to one embodiment, $\epsilon_t$ is distributed as a standard normal variate. In other words $\epsilon_t$ is drawn from a standard normal distribution with a mean of 0 and a standard deviation of 1.

Advantageously, in this manner, a means of simulating future economic scenarios and determining the interrelation of asset classes is provided.

Financial Product Exposure Determination

As discussed above, one method of determining how a financial product behaves relative to a set of factor asset classes is to perform returns-based style analysis. According to one embodiment, returns for a given financial product may be estimated as a function of returns in terms of one or more of the factor asset classes described above based on the following equation:

$$r_{ft} = \alpha_{ft} + S_{f1}r_{1t} + S_{f2}r_{2t} + \ldots + S_{fn}r_{nt} + \epsilon_t \qquad \text{(EQ \#4)}$$

where, $\alpha_{ft}$ is the mean of the left over residual risk ("selection variance") of the financial product return that cannot be explained in terms of the factor loadings.

$r_{ft}$ is the return for financial product f at time t, $r_{nt}$ is the return for factor n at time t, and $\epsilon_t$ is the residual at time t that is unexplained by movements in the factor returns.

The financial product exposure determination module 315 computes the factor asset class exposures for a particular fund via a nonlinear estimation procedure. The exposure estimates, $S_{fn}$, are called style coefficients, and are generally restricted to the range [0,1] and to sum to one. In other embodiments, these restrictions may be relaxed (for example, with financial products that may involve short positions, the coefficients could be negative). Alpha may be thought of as a measure of the relative under or over performance of a particular fund relative to its passive style benchmark.

At this point in the process, the goal is to take any individual group of assets that people might hold, such as a group of mutual funds, and map those assets onto the factor model, thus allowing portfolios to be simulated forward in time. According to one embodiment, this mapping is achieved with what is referred to as "returns-based style analysis" as described in Sharpe [1992], which is hereby incorporated by reference. Generally, the term "style analysis" refers to determining a financial product's exposure to changes in the returns of a set of major asset classes using Quadratic Programming or similar techniques.

Figure 6:
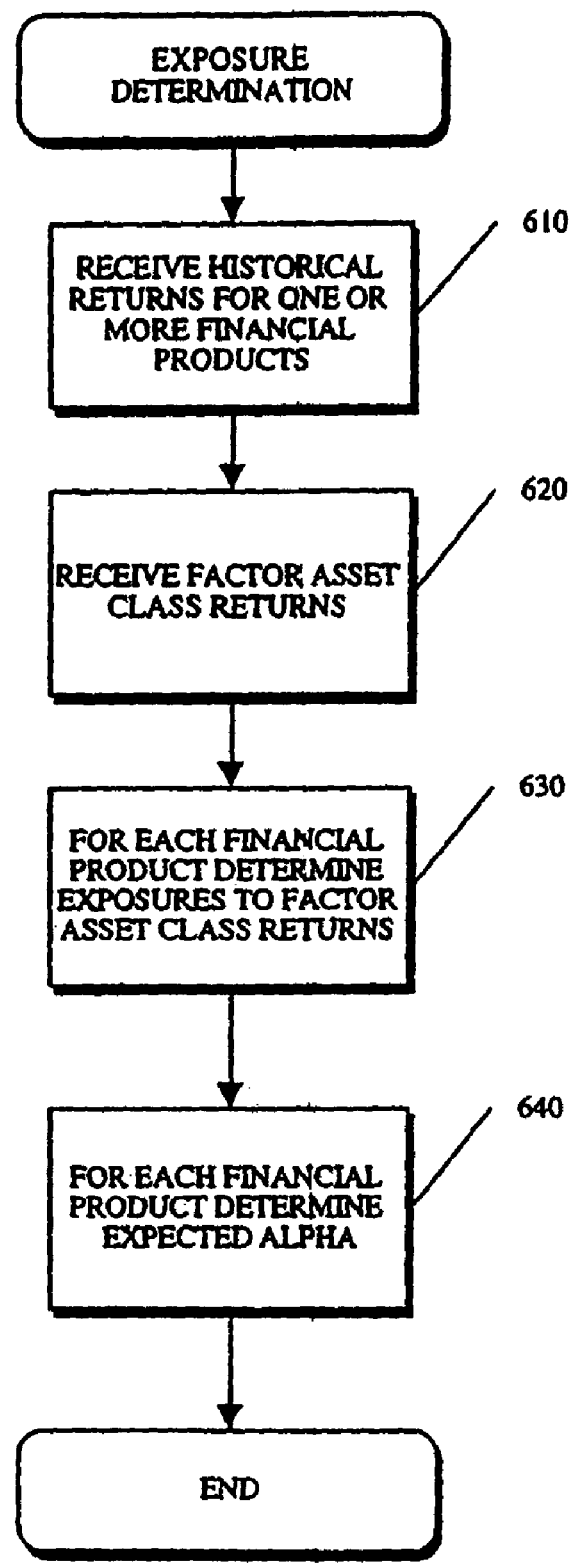
FIG. 6 is a flow diagram illustrating financial product exposure determination according to one embodiment of the present invention.

FIG. 6 is a flow diagram illustrating a method of determining a financial product's exposures to factor asset class returns according to one embodiment of the present invention. At step 610, the historical returns for one or more financial products to be analyzed are received. According to one embodiment, the financial product exposure module 315 may reside on a server device and periodically retrieve the historical return data from a historical database stored in another portion of the same computer system, such as RAM, a hard disk, an optical disc, or other storage device. Alternatively, the financial product exposure module 325 may reside on a client system and receive the historical return data from a server device as needed. At step 620, factor asset class returns are received.

At step 630, QP techniques or the like are employed to determine estimated exposures (the S coefficients) to the factor asset class returns.

At step 640, for each financial product, expected future alpha is determined for each subperiod of the desired scenario period. With regards to mutual finds or related financial products, for example, historical alpha alone is not a good estimate of future alpha. That is, a given mutual fund or related financial product will not continue to outperform/under perform its peers indefinitely into the future. Rather, empirical evidence suggests that over performance may partially persist over one to two years while under performance may persist somewhat longer (see for example, Carhart, Mark M. "On Persistence in Mutual Fund Performance." Journal of Finance, March 1997, Volume 52 No. 1, pp. 57-82).

For example, future alpha may depend upon a number of factors, such as turnover, expense ratio, and historical alpha. Importantly, one or more of these factors may be more or less important for particular types of funds. For example, it is much more costly to buy and sell in emerging markets as compared to the market for large capitalization US equities. In contrast, bond turnover can be achieved at a much lower cost, therefore, turnover has much less affect on the future alpha of a bond fund than an equity fund. Consequently, the penalty for turnover may be higher for emerging market funds compared to large cap U.S. equities and bond funds. Improved results may be achieved by taking into account additional characteristics of the fund, such as the fact that the fund is an index fund and the size of the fund as measured by total net assets, for example.

According to one embodiment of the present invention, a more sophisticated model is employed for determining future alpha for each fund:

$$\alpha_f = \alpha_{base} + \rho^t(\alpha_{historical} - \alpha_{base}) \qquad \text{(EQ \#5)}$$

where, $\alpha_{base}$ is the baseline prediction for future Alpha of the fund
$\rho$, Rho, governs the speed of decay from $\alpha_{historical}$ to $\alpha_{base}$
$\alpha_{historical}$ is Alpha estimated in Equation #4
According to one embodiment, $$\alpha_{base} = C + \beta_1 \text{Expense\_Ratio} + \beta_2 \text{Turnover} + \beta_3 \text{Fund\_Size} \qquad \text{(EQ \#6)}$$

where the parameters are estimated separately for each of four different classes of funds: US equity, foreign equity, taxable bond, nontaxable bond. These parameters may be estimated using conventional econometric techniques, such as ordinary least squares (OLS). According to one embodiment, Rho is estimated by first calculating historical deviations from $\alpha_{base}$ ("residual alpha") and then estimating Rho as the first order serial correlation of the residual alpha series.

Portfolio Optimization

Portfolio optimization is the process of determining a set of financial products that maximizes the utility function of a user. According to one embodiment, portfolio optimization processing assumes that users have a mean-variant utility function, namely, that people like having more wealth and dislike volatility of wealth. Based on this assumption and given a user's risk tolerance, the portfolio optimization module 340 calculates the mean-variance efficient portfolio from the set of financial products available to the user. As described above, constraints defined by the user may also be taken into consideration by the optimization process. For example, the user may indicate a desire to have a certain percentage of his/her portfolio allocated to a particular financial product. In this example, the optimization module 340 determines the allocation among the unconstrained financial products such that the recommended portfolio as a whole accommodates the user's constraint(s) and is optimal for the user's level of risk tolerance.

Prior art mean-variant portfolio optimization traditionally treats the problem as a single period optimization. Importantly, in the embodiments described herein, the portfolio optimization problem is structured in such as way that it may explicitly take into account the impact of different investment horizons and the impact of intermediate contributions and withdrawals. Further the problem is set up so that it may be solved with QP methods.

Figure 7:
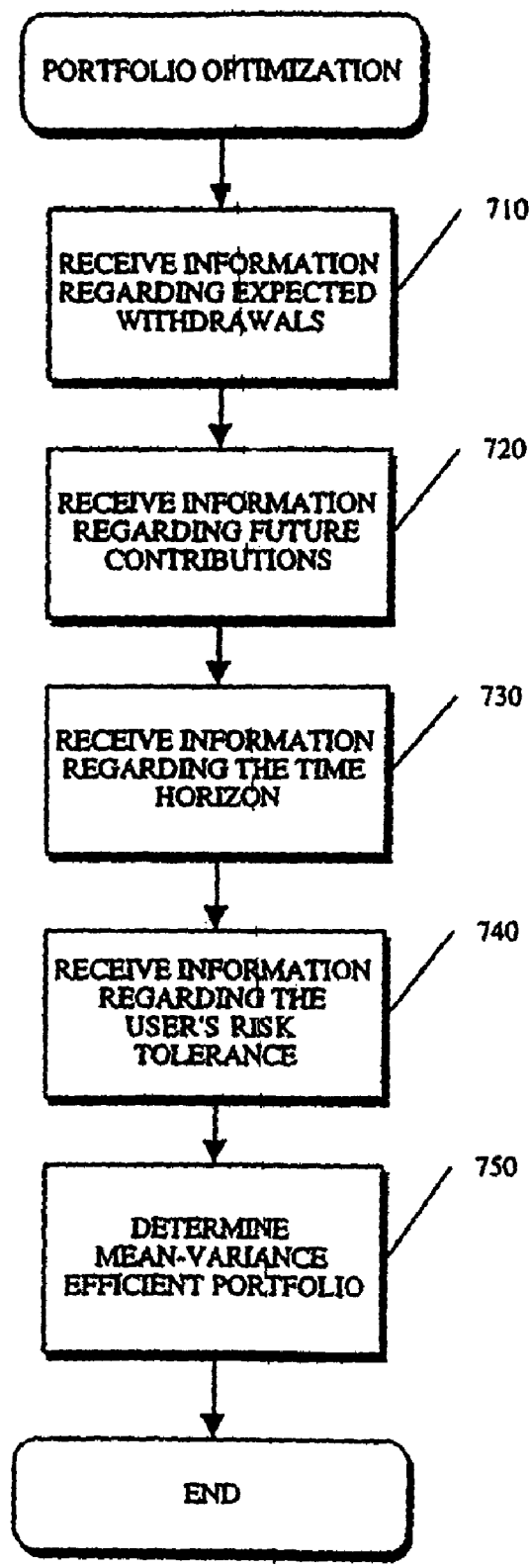
FIG. 7 is a flow diagram illustrating portfolio optimization according to one embodiment of the present invention.

Referring now to FIG. 7, a method of portfolio optimization according to one embodiment of the present invention will now be described. At step 710, information regarding expected withdrawals is received. This information may include the dollar amount and timing of the expected withdrawal. At step 720, information regarding expected future contributions is received. According to one embodiment, this information may be in the form of a savings rate expressed as a percentage of the user's gross income or alternatively a constant or variable dollar value may be specified by the user.

At step 730, information regarding the relevant investment time horizon is received. In an implementation designed for retirement planning, for example, the time horizon might represent the user's desired retirement age.

At step 740, information regarding the user's risk tolerance, Tau, is received.

At step 750, the mean-variance efficient portfolio is determined. According to one embodiment, wealth in real dollars at time T is optimized by maximizing the following mean-variance utility function by determining portfolio proportions ($X_i$):

$$U = E(W_T) - \frac{Var(W_T)}{\tau} \quad \text{(EQ \#7)}$$

where for a given scenario,
$E(W_T)$ is the expected value of wealth at a time T
$Var(W_T)$ is the variance of wealth at time T
$\tau$ is the user's risk tolerance $$W_T = X_1 \sum_{t=0}^{T-1} C_t \prod_{j=t+1}^{T} (1 + R_{j1}) + \ldots + X_n \sum_{t=0}^{T-1} C_t \prod_{j=t+1}^{T} (1 + R_{jn}) + g \quad \text{(EQ \#8)}$$

where,
$X_i$ represents the recommended constant proportion of each net contribution that should be allocated to financial product i.
$C_t$ represents the net contribution at time t,
$R_{ji}$ represents the expected returns for financial product i in year j,
n is the number of financial products that are available for optimization,
g is the value of constrained assets for a given scenario, The product of gross returns represents the compounding of values from year 1 to the horizon. Initial wealth in the portfolio is represented by contribution $C_0$.

Importantly, the financial product returns need not represent fixed allocations of a single financial product. Within the context of the optimization problem, any individual asset return may be composed of a static or dynamic strategy involving one or more financial products. For example, one of the assets may itself represent a constant re-balanced strategy over a group of financial products. Moreover, any dynamic strategy that can be formulated as an algorithm may be incorporated into the portfolio optimization. For example, an algorithm which specifies risk tolerance which decreases with the age of the user could be implemented. It is also possible to incorporate path dependent algorithms (e.g., portfolio insurance).

According to Equation #8, contributions are made from the current year to the year prior to retirement. Typically, a contribution made at time t will be invested from time t until retirement. An exception to this would be if a user specifies a withdrawal, in which case a portion of the contribution may only be held until the expected withdrawal date.

An alternative to the buy and hold investment strategy assumed above would be to implement a "constant mix" investment strategy or re-balancing strategy. For purposes of this example, it is assumed that the recommended fixed target asset-mix will be held in an account for each year in the future. Therefore, each year, assets will be bought and/or sold to achieve the target. Let $f_i$ be the fraction of account wealth targeted for the i-th asset, then the sum of the fractions must equal one.

In the following "evolution" equations, nominal wealth aggregation is modeled for a single taxable account from the current time t=0 to the time horizon t=T. It is assumed that "N" assets are in the account, labeled by the set of subscripts $\{i=1, \ldots, N\}$. The superscripts minus and plus are used to distinguish between the values of a variable just before, and just after, "settlement". The settlement "event" includes paying taxes on distributions and capital gains, investing new contributions, buying and selling assets to achieve the constant mix, and paying load fees. For example, $W^+(t)$ is the total wealth invested in all assets just after settlement at time "t". The evolution equations for the pre- and post-settlement values, the "dollars" actually invested in each asset, are:

$$W_i^-(t) = \begin{cases} W_i^-(0), & t = 0, \\ [1 + R_i(t)] \cdot W_i^+(t-1) - \|k_i(t)\|, & 0 < t \leq T, \end{cases} \quad \text{(19a)}$$

$$W_i^+(t) = \begin{cases} f_i \cdot W^+(t), & 0 \leq t < T, \\ 0, & t = T. \end{cases} \quad \text{(19b)}$$

In the above equation, the double-bar operator $\|\ \|$ is equal to either its argument or zero, whichever is greater. From Eq. (19a), we see that the pre-settlement value at any time (after the initial time) is just the gross return on the post-settlement value of the previous time less the "positive-part" of any distribution, i.e. the "dividend". Here, $k_i(t)$ is the portion of the return of the i-th asset that is distributed, and $R_i(t)$ is the total nominal return on the i-th asset in the one-year period [t−1, t]. We also assume that an initial, pre-settlement value is given for each asset. Eq.(19b) defines the post-settlement value in terms of the asset's constant mix and the total account value after settlement. Since we "cash-out" the portfolio at the time horizon, the final amount in each asset at t=T is zero. The pre- and post-settlement, total values are governed by the pair of equations:

$$W^-(t) = \sum_{i=1}^{N} W_i^-(t), \, 0 \le t \le T, \tag{19c}$$

$$W^+(t) = W^-(t) + C(t) + D(t) - L(t) - S(t), \, 0 \le t \le T. \tag{19d}$$

In Eq.(19d), C(t) is the nominal contribution to the account at time "t", D(t) is the total of all distributed "dividends", L(t) is the "leakage", the total amount paid in loads to both rebalance and to invest additional contributions, and S(t) is the "shrinkage", the total amount paid in taxes on distributions and capital gains. We note that $W^+(T)$ is the final horizon wealth after all taxes have been paid. The value of D(t), the total of all distributed dividends, is the sum of the positive distributions:

$$D(t) = \sum_{i=1}^{N} \|k_i(t)\|, \, 0 \le t \le T. \tag{19e}$$

Similarly, the "leakage" L(t) is the total amount of dollars paid in loads, and $L_i(t)$ is the number of dollars paid in loads on just the i-th asset. These individual loads depend on li, the front-end load fee (a rate) on the i-th asset.

$$L_i(t) = [l_i / (1 - l_i)] \cdot \|W_i^+(t) - \|k_i(t)\| - W_i^-(t)\|, \, 0 \le t \le T. \tag{19f}$$

$$L(t) = \sum_{i=1}^{N} L_i(t), \, 0 \le t \le T. \tag{19g}$$

If there is a short-term loss (negative distribution), the load fee paid on an asset's purchase is just a fixed fraction of the purchase price.[i] When there is a short-term gain (positive distribution), we can re-invest any part of it without load fees, and pay fees only on purchases in excess of the gain. Note that at the horizon, we "cash-out", and don't pay any load fees.

[i] The dollar amount of a load fee is proportional to the ratio l/(1−l). That's because our wealth variables are all measured as "net" loads. To see this, suppose we make a contribution c. After loads, we are left with W=(1−l)c. In terms of W, the amount we paid in loads is L=lc=[l/(1−l)] W.

The equation for the "shrinkage" S(t), the total amount paid in taxes, has two terms. The first term is the tax on distributions and is multiplied by the marginal tax-rate; the second term is the tax on capital gains and is multiplied by the capital gains tax-rate.

$$S(t) = \tau_m \cdot \sum_{i=1}^{N} k_i(t) + \tag{19h}$$

$$\tau_{cg} \cdot \sum_{i=1}^{N} [1 - B_i(t-1) / W_i^-(t)] \cdot \|W_i^-(t) - W_i^+(t)\|, \, 0 \le t \le T.$$

In Eq.(19h), the capital gains tax depends on the basis $B_i(t)$, the total of all after-tax nominal-dollars that have been invested in the i-th asset up to time "t". Note that there can be either a capital gain or loss. The double-bar operator ensures that capital gains are triggered only when there is a sale of assets. At the horizon, we sell all assets, and automatically pay all taxes. The basis $B_i(t)$, evolves according to the following recursion equation:

$$B_i(t) = \begin{cases} B_i(0), & t = 0, \\ B_i(t-1) + \|W_i^+(t) - W_i^-(t)\| + L_i(t) - \\ \quad [B_i(t-1)/W_i^-(t)] \cdot \|W_i^-(t) - W_i^+(t)\| \end{cases}, \, 0 < t \le T. \tag{19i}$$

Note that all new purchases are made with after-tax dollars, and add to the basis; all sales decrease the basis. Further, any load paid to purchase an asset adds to the basis. We assume that the initial basis $B_i(0)$ of an asset is either given, or defaults to the initial, pre-settlement value so that the average basis is initially equal to one.

A "constitutive" equation for $k_i(t)$ is needed to complete our system of equations. Short-term distributions depend on the "type" of asset; here we model mutual funds:

$$k_i(t) = \begin{cases} k_i(0), & t = 0, \\ \kappa_i \cdot R_i(t) \cdot W_i^+(t-1), & 0 < t \le T. \end{cases} \tag{20a}$$

Often, we set the initial distribution to zero, and assume that the asset's initial pre-settlement value has already accounted for any non-zero, initial value. We note that the distribution is proportional to the amount of wealth at "stake" during the prior-period. For mutual funds, we assume that the distribution is a fraction $\kappa_i$ of the prior-period's total return, and therefore is also proportional to $R_i(t)$. Note that the distribution in Eq.(20a) can be a gain (positive) or a loss (negative). In contrast, the constitutive equation for stocks takes the form:

$$k_i(t) = \begin{cases} k_i(0), & t = 0, \\ \kappa_i \cdot [1 + R_i(t)] \cdot W_i^+(t-1), & 0 < t \le T. \end{cases} \tag{20b}$$

For stocks, the proportionality constant $\kappa_i$ models a constant dividend "yield", and the distribution is always a gain (non-negative). For stocks (mutual funds), the distribution is proportional to the gross (simple) return.

Before we leave this section, a word on 401(k) plans and IRA's (with no load funds). For these accounts, the loads and taxes are ignored, and there is no basis in the asset. At "settlement", the user just re-balances their account. The evolution equations for these accounts is trivial in comparison to the equations for a general taxable account:

$$W_i^+(t) = f_i \cdot W^+(t), \, 0 \le t \le T, \tag{21a}$$

$$W^+(t) = \begin{cases} W^+(0), & t = 0, \\ \left(1 + \sum_{i=1}^{N} f_i \cdot R_i(t)\right) \cdot W^+(t-1) + C(t), & 0 < t \le T. \end{cases} \tag{21b}$$

At the time horizon T, the total wealth in a non-taxable account is just $W^+(T)$. This is a pre-withdrawal total value. When retirement withdrawals are made from a tax-free account, they are taxed at the client's average tax-rate, $\tau_a$. Therefore, the "after-tax" equivalent value is equal to "pre-tax" wealth $W^+(T)$ times the tax factor $(1-\tau_a)$ How do we aggregate taxable and non-taxable accounts to get total portfolio wealth? We choose non-taxable accounts as a baseline. If all the funds in a non-taxable account were converted to an annuity, and the annuity payments were taken as withdrawals, then the withdrawals would mimic a salary subject to income taxes. This is precisely the client's pre-retirement situation. Before aggregating a taxable account, we scale its "after-tax" value to this baseline using the formula:

$$W_{baseline} = W_{after-tax}/(1-\tau_\alpha). \tag{22}$$

Essentially, the baseline equivalent is obtained by grossing up values using the average tax-rate.

The evolution equation variables appear "implicitly" in the recursion relations. Hence, we need to "iterate" at each time step to solve for "explicit" variable values.[ii] We illustrate this process with an example. Consider the simple case where there are no distributions, contributions, or taxes; just loads, and a constant-mix strategy. Here, the evolution equations simplify to a single equation for the total, after-settlement wealth $W^+(t)$:

[ii] In practice a robust root-finding algorithm may be used rather than iteration.

$$W^+(t) = W^+(t-1) \cdot \sum_{i=1}^{N} f_i \cdot [1 + R_i(t)] - \sum_{i=1}^{N} f_i \cdot [l_i/(1-l_i)] \cdot \|W^+(t) - [1 + R_i(t)] \cdot W^+(t-1)\|. \tag{23}$$

Note, we only know $W^+(t)$ as an implicit function of $W^+(t-1)$, but given a guess for it's value, we can refine the guess by substituting it into the right-side of Eq.(23).

It's instructive to re-write Eq.(23) as the pair of equations in terms of an "effective" return $R_e(t)$:

$$W^+(t) = [1 + R_e(t)] \cdot W^+(t-1), \tag{24a}$$

$$R_e(t) = \sum_{i=1}^{N} f_i \cdot R_i(t) - \sum_{i=1}^{N} f_i \cdot [l_i/(1-l_i)] \cdot \|R_e(t) - R_i(t)\|. \tag{24b}$$

Eq.(24a) is the evolution equation for a single asset with the effective return. Eq.(24b) is an implicit equation for the effective return $R_e(t)$ in terms of the asset returns $R_i(t)$. We solve for the effective return using iteration. When the loads are equal to zero, as expected, the effective return is just a weighted-average of the asset returns. Even when the loads are not zero, this average return is a good initial guess for the iteration procedure. In fact, using the average return as the initial guess and iterating once yields the following explicit approximation for the effective return:

$$R_{wgt}(t) = \sum_{i=1}^{N} f_i \cdot R_i(t), \tag{25a}$$

$$R_e(t) \approx R_{wgt}(t) - \sum_{i=1}^{N} f_i \cdot l_i \cdot \|R_{wgt}(t) - R_i(t)\|. \tag{25b}$$

Eq.(25b) is consistent with our intuition, and agrees well with higher order iterates.

To determine the mutual fund input moments we must first calculate the kernel moments. This procedure calculates successive annual kernel moments and averages the result. The resulting mean and covariance matrix is then utilized by the reverse optimization procedure and also as an input into the optimization procedure.

To calculate analytic core moments, first we must describe the wealth for each core asset for an arbitrary holding period. For each of the core assets, the resulting wealth from an arbitrary investment horizon can be written as: [Note, this is an approximation for equities]

$$W_{t,T} = \exp\left\{\sum_{j=t}^{T-1} a + bX_{j+1} + c\Pi_{j+1} + d\delta_{j+1} + eX_j + f\Pi_j + g\delta_j\right\}$$

Where:
a, b, C, d, e, f, g=Constants
$X_j$=Real rate in year j
$\Pi_j$=Inflation rate in year j
$\delta_j$=Dividend growth rate in year j The expectation of wealth for any of the core assets given information at time zero is then:

$$E_0 W_{t,T} = e^{a(T-t)} E_0 e^{\sum_{j=t}^{T-1} eX_j + bX_{j+1}} E_0 e^{\sum_{j=t}^{T-1} f\Pi_j + c\Pi_{j+1}} E_0 e^{\sum_{j=t}^{T-1} g\delta_j + d\delta_{j+1}}$$

Since X, Π, and δ are independent, we can deal with each of these expectations separately. For example, consider the contribution in the above equation from inflation. The summation can be rewritten as:

$$E_0 \exp\left\{\sum_{j=t}^{T-1} f\Pi_j + c\Pi_{j+1}\right\} = E_0 \exp\left\{f\Pi_t + \left(\sum_{j=t+1}^{T-1} (f+c)\Pi_j\right) + c\Pi_T\right\}$$

Next, we need to use iterated expectations to determine this expectation. We can write the expectation at time zero as the repeated expectation over the various innovations. For example, the equation for inflation can be rewritten as:

$$E_0 \exp\left\{f\Pi_t + \left(\sum_{j=t+1}^{T-1} (f+c)\Pi_j\right) + c\Pi_T\right\} = E_{\varepsilon_1} E_{\varepsilon_2} \cdots E_{\varepsilon_T} \exp\left\{f\Pi_t + \left(\sum_{j=t+1}^{T-1} (f+c)\Pi_j\right) + c\Pi_T\right\}$$

$$= E_{\varepsilon_1} E_{\varepsilon_2} \cdots E_{\varepsilon_{T-1}} \exp\left\{f\Pi_t + \left(\sum_{j=t+1}^{T-1} (f+c)\Pi_j\right)\right\} E_{\varepsilon_T}[e^{c\Pi_T}]$$

Assuming inflation follows a modified square root process:

$$\Pi_t = \mu_\pi + \rho_\pi \Pi_{t-1} + \sigma_\pi \sqrt{\|\Pi_{t-1}\|} \epsilon_t$$

Where $\|\ \|$ denotes the Heaviside function $$\|\Pi_t\| \equiv \begin{cases} 0 & \text{if } \Pi_t \leq 0 \\ \Pi_t & \text{if } \Pi_t > 0 \end{cases}$$

Now we recursively start taking the expectations over epsilon starting at the end and working backward. So:

$$E_{\epsilon_T}[e^{c\Pi_T}] = E_{\epsilon_T}\left[e^{c\mu_\pi + c\rho_\pi \Pi_{T-1} + c\sigma_\pi \sqrt{\|\Pi_{T-1}\|} \epsilon_T}\right]$$

$$\approx e^{c\left(\mu_\pi + \rho_\pi \Pi_{T-1} + \frac{1}{2} c\sigma_\pi^2 \Pi_{T-1}\right)}$$

Where the approximation is due to the Heaviside function. Combining this with the above equation yields:

$$E_{\epsilon_1} E_{\epsilon_2} \ldots E_{\epsilon_{T-1}} \exp\left\{f\Pi_t + \left(\sum_{j=t+1}^{T-1}(f+c)\Pi_j\right)\right\} E_{\epsilon_T}[e^{c\Pi_T}]$$

$$= E_{\epsilon_1} E_{\epsilon_2} \ldots E_{\epsilon_{T-2}} \exp\left\{f\Pi_t + \left(\sum_{j=t+1}^{T-1}(f+c)\Pi_j\right)\right\}$$

$$E_{\epsilon_{T-1}}\left[e^{c\mu_\pi + \left(c\rho_\pi + \frac{1}{2}c^2\sigma_\pi^2 + c + f\right)\Pi_{T-1}}\right]$$

In general for any time period t, an exponential linear function of $\Pi$ has the following expectation:

$$E_{\epsilon_t}[e^{A_j + B_j \Pi_t}] = E_{\epsilon_t}\left[e^{A_j + B_j(\mu_\pi + \rho_\pi \Pi_{t-1} + \sigma_\pi \|\Pi_{t-1}\| \epsilon_t)}\right]$$

$$= e^{A_j + B_j \mu_\pi + B_j \Pi_{t-1}\left(\rho_\pi + \frac{1}{2}\sigma_\pi^2 B_j\right)}$$

$$= e^{A_j + B_j \mu_\pi + \left(B_j\left(\rho_\pi + \frac{1}{2}\sigma_\pi^2 B_j\right)\right)\Pi_{t-1}}$$

$$= e^{A_{j-1} + B_{j-1} \Pi_{t-1}}$$

The critical feature is that an exponential linear function of $\Pi$ remains exponential linear after taking the expectation. This invariance allows for the backward recursion calculation. Only the constant (A) and the slope (B) are changing with repeated application of the expectation operator. The evolution of A and B can be summarized as $$A_J = A_{J+1} + \mu_\pi B_{J+1}$$

$$B_J = B_{J+1}[\rho_\pi + \frac{1}{2}\sigma_\pi^2 B_{J+1}]$$

In addition, the $B_J$ coefficient has to be increased by (c+f) to account for the additional $\Pi_j$ term in the summation. To implement this recursive algorithm to solve for expected wealth, first define the following indicator variable:

$$I(t_1, t_2) = \begin{cases} 1 & \text{if } t_1 \leq j \leq t_2 \\ 0 & \text{Otherwise} \end{cases}$$

Next, the following algorithm may be employed:
InitialConditions J=T, $A_T$=0, $B_T$=c
(1) J=J−1
(2) $A_J = A_{J+1} + \mu_\pi B_{J+1}$
   $B_J = B_{J+1}[\rho_\pi + \frac{1}{2}\sigma_\pi^2 B_{J+1}] + c \cdot I(t+1, T-1) + f \cdot I(t, T-1)$
(3) if J=0, End
   $E(W_{t,T}) = e^{A_1 + B_1 \pi_0}$
(4) Go To (1)

The same technique applies to X since it is also a square root process. A similar technique can be used to create a recursive algorithm for the δ component. The only difference is that δ is an AR(1) process instead of a square root process. In particular, $$\delta_t = \mu_\delta + \rho_\delta \delta_{t-1} + \sigma_\delta \epsilon_t$$

For this AR(1) process, the expectation is of the following form.

$$E_{\epsilon_t}[e^{A_j + B_j \delta_t}] = E_{\epsilon_t}[e^{A_j + B_j(\mu_\delta + \rho_\delta \delta_{t-1} + \sigma_\delta \epsilon_t)}]$$

$$= e^{A_j + B_j \mu_\delta + \frac{1}{2}\sigma_\delta^2 B_j + B_j \rho_\delta \delta_{t-1}}$$

$$= e^{A_{j-1} + B_{j-1} \delta_{t-1}}$$

The evolution of A and B is thus summarized as:

$$A_J = A_{J+1} + B_{J+1}(\mu_\delta + \frac{1}{2}\sigma_\delta^2)$$

$$B_J = B_{J+1} \rho_\delta$$

The recursive relationship for δ is then:
InitialConditions J=T, $A_T$=0, $B_T$=d
(1) J=J−1
(2) $A_J = A_{J+1} + B_{J+1}(\mu_\delta + \frac{1}{2}\sigma_\delta^2)$
   $B_J = B_{J+1}\rho_\delta + d \cdot I(t+1, T-1) + g \cdot I(t, T-1)$
(3) if J=0, End
   $E(W_{t,T}) = e^{A_1 + B_1 \delta_0}$
(4) Go To (1)

This framework for calculating expected wealth can also be used to calculate the variance of wealth for an arbitrary holding period. From the definition of variance, we have:

$$V_0(W_{t,T}) = E_0(W_{t,T}^2) - E_0(W_{t,T})^2$$

but $$W_{t,T}^2 = \left[\exp\left\{\sum_{j=t}^{T-1} a + bX_{j+1} + c\Pi_{j+1} + d\delta_{j+1} + eX_j + f\Pi_j + g\delta_j\right\}\right]^2$$

$$= \exp\left\{\sum_{j=t}^{T-1} 2(a + bX_{j+1} + c\Pi_{j+1} + d\delta_{j+1} + eX_j + f\Pi_j + g\delta_j)\right\}$$

So the same technique can be used with a simple redefinition of the constants to be twice their original values. Similarly, the covariance between any two core assets can be calculated by simply adding corresponding constants and repeating the same technique.

For the current parameter values, the constants for Bills, Bonds, and Equities are:

|  | a | b | c | d | e | F | g |
|---|---|---|---|---|---|---|---|
| Bills | 0.0077 | 0 | −1 | 0 | 1 | 0.7731 | 0 |
| Bonds | 0.0642 | −2.5725 | −3.8523 | 0 | 2.5846 | 2.9031 | 0 |
| Equities | 0.0331 | −2.4062 | −3.7069 | 4.4431 | 2.48 | 2.79 | −3.5487 |

Above, a methodology was described for calculating core asset analytic moments for arbitrary horizons. This section describes how these moments are translated into annualized moments. The procedure described in this section essentially calculates successive annual moments for a twenty (20) year horizon and computes the arithmetic average of these moments. These 'effective' annual moments may then be used as inputs into the reverse optimization procedure and the individual optimization problem.

For this calculation, first make the following definitions:
$M_t^j$=Expected return for $j^{th}$ asset over the period t, t+1
$Cov_t^{i,j}$=Covariance of returns on asset i with asset j over the period t, t+1

These expected returns and covariance are calculated using the formulas described above The effective annual expected return for asset j is then calculated as:

$$M^j = \sum_{t=1}^{T} \omega_t M_t^j$$

Similarly, the effective annual covariance between returns on asset i and returns on asset j are calculated as: (Note, the weights, $\omega_t$, are between zero and one, and sum to one.)

$$Cov^{i,j} = \sum_{t=1}^{T} \omega_t Cov_t^{i,j}$$

In one embodiment, this annualizing technique could be personalized for a given user's situation. For example, the user's horizon could specify T, and their level of current wealth and future contributions could specify the relevant weights. However for purposes of illustration, the relevant 'effective' moments for optimization and simulation are computed assuming a horizon of 20 years (T=20), and equal weights (i.e. 1/T).

The techniques described in this section allow for the calculation of the following effective annual moments:

| Output parameter name | Description | Units |
|---|---|---|
| $M^1$ | Bills: expected return | Return per year |
| $M^2$ | Bonds: expected return | Return per year |
| $M^3$ | Equity: expected return | Return per year |
| $Cov^{1,1}$ | Bills: variance of returns | (Return per year)$^2$ |
| $Cov^{2,2}$ | Bonds: variance of returns | (Return per year)$^2$ |
| $Cov^{3,3}$ | Equity: variance of returns | (Return per year)$^2$ |
| $Cov^{1,2}$ | Bills and Bonds: covariance | (Return per year)$^2$ |
| $Cov^{1,3}$ | Bills and Equity: covariance | (Return per year)$^2$ |
| $Cov^{2,3}$ | Bonds and Equity: covariance | (Return per year)$^2$ |

Plan Monitoring

Exemplary conditions which may trigger an alert of some sort from the plan monitoring module 350 were described above. At this point, some of the real world events that may lead to those alert conditions will now be described. The real world events include the following: (1) a financial product's style exposure changes, (2) the market value of the user's assets have changed in a significant way, (3) new financial products become available to the user, (4) the risk characteristics of the user's portfolio have deviated from the desired risk exposure, or (5) the currently recommended portfolio no longer has the highest expected return for the current level of portfolio risk (e.g., the portfolio is no longer on the mean-variance efficient frontier). An efficient frontier is the sets of assets (portfolios) that provide the highest level of return over different levels of risk. At each point on the efficient frontier, there is no portfolio that provides a higher expected return for the same or lower level of risk.

When a financial product's exposures change it may pull the user's portfolio off of the efficient frontier. That is, due to a shift in the investment style of a particular financial product, the portfolio as a whole may no longer have the highest expected return for the current level of risk. According to one embodiment of the present invention, if the inefficiency is greater than a predetermined tolerance or if the inefficiency will substantially impact one of the user's financial goals, such as his/her retirement income goal, then the user is notified that he/she should rebalance the portfolio. However, if the inefficiency is within the predefined tolerance then the plan monitoring module 350 may not alert the user. In one embodiment, the predefined tolerance depends upon the impact of the inefficiency on expected wealth. In addition, the tolerance could depend upon relevant transaction costs.

A significant change in the market value of the user's assets may affect one or both of the probability of achieving a financial goal and the current risk associated with the portfolio. In the case that the user's portfolio has experienced a large loss, the portfolio may no longer be within a predetermined probability tolerance of achieving one or more financial goals. Further, as is typical in such situations, the risk associated with the portfolio may also have changed significantly. Either of these conditions may cause the user to be notified that changes are required in the portfolio allocation or decision variables to compensate for the reduction in market value of the portfolio. A large increase in the value of the user's portfolio, on the other hand, could trigger an alert due to the increase in the probability of achieving one or more financial goals or due to the altered risk associated with the newly inflated portfolio.

When one or more new financial products become available to the user, the user may be alerted by the plan monitoring module 350 if, for example, a higher expected return may be possible at lower risk as a result of diversifying the current portfolio to include one or more of the newly available financial products.

Figure 8:
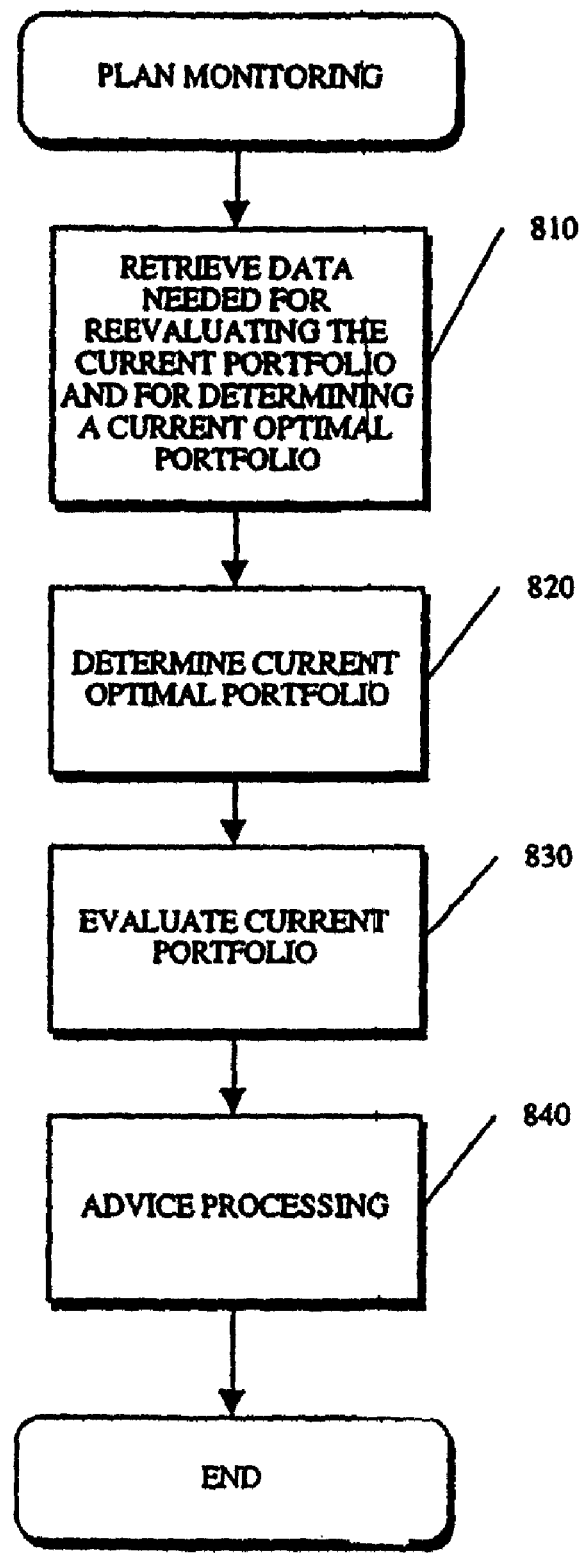
FIG. 8 is a flow diagram illustrating plan monitoring processing according to one embodiment of the present invention.

Having explained the potential effects of some real world events that may trigger alerts, exemplary plan monitoring processing will now be described with respect to FIG. 8. At step 810, the data needed for reevaluating the current portfolio and for determining a current optimal portfolio is retrieved, such as the user profile and portfolio data which may be stored on the AdviceServer 110, for example. Importantly, the user profile may include investment plan profile information stored during a previous session, such as the probability of reaching one or more financial goals, the risk of the portfolio, and the like. As described above, selected user information on the AdviceServer 110 may be kept up to date automatically if the financial advisory system 100 has access to the record-keeping systems of the user's employer. Alternatively, selected user information may be updated manually by the user.

At step 820, a current optimal portfolio is determined, as described above. Importantly, changes to the user database and/or portfolio data are taken into consideration. For example, if one or more new financial products have become available to the user, portfolios including the one or more new financial products are evaluated.

At step 830, the current portfolio is evaluated in a number of different dimensions to determine if any trigger conditions are satisfied. For example, if the increase in expected wealth, or the increase in the probability of reaching one or more investment goals resulting from a reallocation to the current optimal portfolio is above a predetermined tolerance, then processing will continue with step 840. Additionally, if the risk of the current portfolio is substantially different from the investment plan profile or if the probability of achieving one or more financial goals is substantially different from the investment plan profile, then processing continues with step 840.

At step 840, advice processing is performed. According to one embodiment of the present invention, based upon the user's preference among the decision variables, the system may offer advice regarding which decision variable should be modified to bring the portfolio back on track to reach the one or more financial goals with the desired probability. In addition, the system may recommend a reallocation to improve efficiency of the portfolio. An alert may be generated to notify the user of the advice and/or need for affirmative action on his/her part. As described above, the alert may be displayed during a subsequent user session with the financial advisory system 100 and/or the alerts may be transmitted immediately to the user by telephone, fax, email, pager, fax, or similar messaging system.

Advantageously, the plan monitoring module 350 performs ongoing portfolio evaluation to deal with the constantly changing data that may ultimately affect the exposure determination process and the portfolio optimization process. In this manner, the user may receive timely advice instructing him/her how to most efficiently achieve one or more financial goals and/or maintain one or more portfolio characteristics based upon the available set of financial products.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method comprising:
   determining feasible exposures, by a financial product mapping module being executed by one or more processors of one or more computer systems, to a plurality of asset classes achievable by a particular investor by determining a combination of one or more asset classes and proportions thereof that characterize future performance of each financial product of a limited set of financial products available to the particular investor for investment, wherein the limited set of financial products available to the particular investor is a proper subset of a set of all financial products available for investment via public markets; and
   identifying, by a portfolio optimization module being executed by the one or more processors, a recommended efficient portfolio of financial products from the limited set of financial products by maximizing an expected utility of wealth for the particular investor based upon the feasible exposures.

2. The method of claim 1, further comprising modeling expected future asset class returns as a function of one or more economic factors by generating return scenarios for each asset class of the plurality of asset classes based upon future scenarios of the one or more economic factors.

3. The method of claim 1, wherein said determining a combination of one or more asset classes and proportions thereof that characterize future performance of each financial product of a limited set of financial products comprises performing returns-based style analysis.

4. The method of claim 1, wherein said determining a combination of one or more asset classes and proportions thereof that characterize future performance of each financial product of a limited set of financial products comprises surveying the underlying assets held in the financial product.

5. The method of claim 1, wherein said determining a combination of one or more asset classes and proportions thereof that characterize future performance of each financial product of a limited set of financial products comprises obtaining exposure information based on a target benchmark associated with the financial product.

6. The method of claim 1, wherein said determining a combination of one or more asset classes and proportions thereof that characterize future performance of each financial product of a limited set of financial products comprises categorizing exposures based on standard industry classification schemes.

7. The method of claim 1, further comprising forecasting the probability of the particular investor meeting an identified financial goal based upon the recommended efficient portfolio.

8. The method of claim 1, further comprising receiving information indicative of the particular investor's risk tolerance.

9. The method of claim 8, wherein said maximizing an expected utility of wealth for the particular investor comprises determining expected returns and volatility of the expected returns for each of a plurality of efficient portfolios comprising a combination of one or more financial products from the limited set of financial products based upon said determining a combination of one or more asset classes and proportions thereof that characterize future performance of each financial product.

10. The method of claim 1, wherein the limited set of financial products available to the particular investor for investment comprises financial products offered through an employee-directed defined contribution plan.

11. A computer-readable storage medium readable by one or more computer systems and tangibly embodying a set of instructions executable by one or more processors of the one or more computer systems to perform method steps for identifying a recommended efficient portfolio of financial products, the method steps comprising:
    determining feasible exposures to a plurality of asset classes achievable by a particular investor by determining a combination of one or more asset classes and proportions thereof that characterize future performance of each financial product of a limited set of financial products available to the particular investor for investment, wherein the limited set of financial products available to the particular investor is a proper subset of a set of all financial products available for investment via public markets; and
    identifying a recommended efficient portfolio of financial products from the limited set of financial products by maximizing an expected utility of wealth for the particular investor based upon the feasible exposures.

12. The computer-readable storage medium of claim 11, wherein the method steps further comprise modeling expected future asset class returns as a function of one or more economic factors by generating return scenarios for each asset class of the plurality of asset classes based upon future scenarios of the one or more economic factors.

13. The computer-readable storage medium of claim 11, wherein the method steps further comprise forecasting the probability of the particular investor meeting an identified financial goal based upon the recommended efficient portfolio.

14. The computer-readable storage medium of claim 11, wherein the method steps further comprise receiving information indicative of the particular investor's risk tolerance.

15. A computer-implemented method comprising:
a step, performed by a financial product mapping module being executed by one or more processors of one or more computer systems, for determining feasible exposures to a plurality of asset classes achievable by a particular investor based upon a limited set of financial products available to the particular investor for investment, wherein the limited set of financial products available to the particular investor is a proper subset of a set of all financial products available for investment via public markets; and
a step, performed by a portfolio optimization module being executed by the one or more processors, for identifying a recommended efficient portfolio of financial products from the limited set of financial products.

16. The method of claim 15, further comprising a step for modeling expected future asset class returns as a function of one or more economic factors.

17. A computer system comprising
a storage device having stored therein one or more routines operable to determine feasible exposures to a plurality of asset classes achievable by a particular investor and identify a recommended efficient portfolio of financial products from a limited set of financial products available to the particular investor for investment; and
one or more processors coupled to the storage device and operable to execute the one or more routines, where
the limited set of financial products available to the particular investor is a proper subset of a set of all financial products available for investment via public markets;
the feasible exposures are determined by determining a combination of one or more asset classes and proportions thereof that characterize future performance of each financial product of the limited set of financial products; and
the recommended efficient portfolio is identified by maximizing an expected utility of wealth for the particular investor based upon the feasible exposures.

18. The computer system of claim 17, wherein the one or more routines are further operable to model expected future asset class returns as a function of one or more economic factors by generating return scenarios for each asset class of the plurality of asset classes based upon future scenarios of the one or more economic factors.

19. The computer system of claim 17, wherein said determining a combination of one or more asset classes and proportions thereof that characterize future performance of each financial product of the limited set of financial products comprises performing returns-based style analysis.

20. The computer system of claim 17, wherein said determining a combination of one or more asset classes and proportions thereof that characterize future performance of each financial product of the limited set of financial products comprises surveying underlying assets held in the financial product.

21. The computer system of claim 17, wherein said determining a combination of one or more asset classes and proportions thereof that characterize future performance of each financial product of the limited set of financial products comprises obtaining exposure information based on a target benchmark associated with the financial product.

22. The computer system of claim 17, wherein said determining a combination of one or more asset classes and proportions thereof that characterize future performance of each financial product of the limited set of financial products comprises categorizing exposures based on standard industry classification schemes.

23. The computer system of claim 17, wherein the one or more routines are further operable to forecast the probability of the particular investor meeting an identified financial goal based upon the recommended efficient portfolio.

24. The computer system of claim 17, wherein the one or more routines are further operable to receive information indicative of the particular investor's risk tolerance.

25. The computer system of claim 24, wherein said maximizing an expected utility of wealth for the particular investor comprises determining expected returns and volatility of the expected returns for each of a plurality of efficient portfolios comprising a combination of one or more financial products from the limited set of financial products based upon said determining a combination of one or more asset classes and proportions thereof that characterize future performance of each financial product.

26. The computer system of claim 17, wherein the limited set of financial products available to the particular investor for investment comprises financial products offered through an employee-directed defined contribution plan.

27. The method of claim 10, wherein the employee-directed defined contribution plan comprises a 401(k) plan of an employer of the particular investor.

28. The computer-readable storage medium of claim 11, wherein the limited set of financial products available to the particular investor for investment comprises financial products offered through an employee-directed defined contribution plan.

29. The computer-readable storage medium of claim 28, wherein the employee-directed defined contribution plan comprises a 401(k) plan of an employer of the particular investor.

30. The method of claim 15, wherein the limited set of financial products available to the particular investor for investment comprises financial products offered through an employee-directed defined contribution plan.

31. The method of claim 30, wherein the employee-directed defined contribution plan comprises a 401(k) plan of an employer of the particular investor.

32. The method of claim 26, wherein the employee-directed defined contribution plan comprises a 401(k) plan of an employer of the particular investor.

* * * * *